United States Patent
Dolgov et al.

(10) Patent No.: US 10,922,903 B2
(45) Date of Patent: Feb. 16, 2021

(54) METHODS AND SYSTEMS FOR PROVIDING REMOTE ASSISTANCE TO A STOPPED VEHICLE

(71) Applicant: Waymo LLC, Mountain View, CA (US)

(72) Inventors: Dmitri Dolgov, Mountain View, CA (US); Joshua Herbach, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 76 days.

(21) Appl. No.: 15/704,194

(22) Filed: Sep. 14, 2017

(65) Prior Publication Data

US 2019/0019349 A1    Jan. 17, 2019

Related U.S. Application Data

(60) Provisional application No. 62/531,072, filed on Jul. 11, 2017.

(51) Int. Cl.
| | | |
|---|---|---|
| *G07C 5/00* | (2006.01) | |
| *G05D 1/00* | (2006.01) | |
| *B60W 30/00* | (2006.01) | |

(52) U.S. Cl.
CPC ............. *G07C 5/008* (2013.01); *B60W 30/00* (2013.01); *G05D 1/0027* (2013.01); *G05D 1/0038* (2013.01); *G05D 1/0044* (2013.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 2010/0123779 | A1* | 5/2010 | Snyder | G07C 5/0866 348/148 |
| 2015/0248131 | A1* | 9/2015 | Fairfield | G05D 1/0044 701/2 |
| 2016/0358475 | A1* | 12/2016 | Prokhorov | G05D 1/0022 |
| 2017/0045885 | A1* | 2/2017 | Okumura | B60W 30/00 |
| 2018/0057006 | A1* | 3/2018 | Seki | B60W 10/08 |
| 2018/0224850 | A1* | 8/2018 | Kroop | G08G 1/096725 |
| 2019/0137290 | A1* | 5/2019 | Levy | G06Q 50/30 |

* cited by examiner

*Primary Examiner* — Kelly D Williams
(74) *Attorney, Agent, or Firm* — McDonnell Boehnen Hulbert & Berghoff LLP

(57) ABSTRACT

Examples described may enable provision of remote assistance for an autonomous vehicle. An example method includes a computing system operating in a rewind mode. In the rewind mode, the system may be configured to provide information to a remote assistance operated based on a remote-assistance triggering criteria being met, such as determining that the autonomous vehicle has been stopped for a period of time. When the triggering criteria is met, the remote assistance system may provide data from the time leading up to when the remote-assistance triggering criteria was met that was capture of the environment of autonomous vehicle to the remote assistance operator. Based on viewing the data, the remote assistance operator may provide and input to the system that causes a command to be issued to the autonomous vehicle.

20 Claims, 14 Drawing Sheets

METHODS AND SYSTEMS FOR PROVIDING REMOTE ASSISTANCE TO A STOPPED VEHICLE

CROSS REFERENCE TO RELATED APPLICATION

The present patent application claims priority to U.S. Provisional Patent Application Ser. No. 62/531,072, filed on Jul. 11, 2017, the entire contents of which are hereby incorporated by reference.

BACKGROUND

A vehicle could be any wheeled, powered vehicle and may include a car, truck, motorcycle, bus, etc. Vehicles can be utilized for various tasks such as transportation of people and goods, as well as many other uses.

Some vehicles may be partially or fully autonomous. For instance, when a vehicle is in an autonomous mode, some or all of the driving aspects of vehicle operation can be handled by an autonomous vehicle system (i.e., any one or more computer systems that individually or collectively function to facilitate control of the autonomous vehicle). In such cases, computing devices located onboard and/or in a server network could be operable to carry out functions such as planning a driving route, sensing aspects of the vehicle, sensing the environment of the vehicle, and controlling drive components such as steering, throttle, and brake. Thus, autonomous vehicles may reduce or eliminate the need for human interaction in various aspects of vehicle operation.

SUMMARY

In one aspect, the present application describes a method of providing remote assistance for an autonomous vehicle. The method may involve determining that the autonomous vehicle has stopped based on data received from the autonomous vehicle. The method may also involve determining that one or more review criteria have been met. In response to the one or more review criteria being met, the method may involve providing at least one image to an operator. The method further includes receiving an operator input. Yet further, the method may include in response to the operator input, providing an instruction to the autonomous vehicle for execution by the autonomous vehicle via a network.

In another aspect, the present application describes a system. The computing system may include a communication unit configured to communicate with an autonomous vehicle by way of a network. The communication unit may be configured to receive data from the autonomous vehicle where the data includes image data and location data and send instructions to the autonomous vehicle for execution by the autonomous vehicle. The system also includes a processor. The processor may be configured to determine that the autonomous vehicle has stopped and determine that one or more review criteria have been met. In response to the one or more review criteria being met, the processor may also be configured to provide at least one image to an operator. The processor is also configured to receive an operator input. Yet further, the processor is configured to determine at least one instruction for the autonomous vehicle, and cause the communication unit to send the instruction to the autonomous vehicle.

In still another aspect, the present application describes an article of manufacture including a non-transitory computer-readable medium having stored thereon instructions that, when executed by a processor in a computing system, causes the computing system to perform operations. The operations may include determining that the autonomous vehicle has stopped based on data received from the autonomous vehicle. The operations may also involve determining that one or more review criteria have been met. In response to the one or more review criteria being met, the operations may involve providing at least one image to an operator. The operations further include receiving an operator input. Yet further, the operations may include in response to the operator input, providing an instruction to the autonomous vehicle for execution by the autonomous vehicle via a network.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

Figure 1:
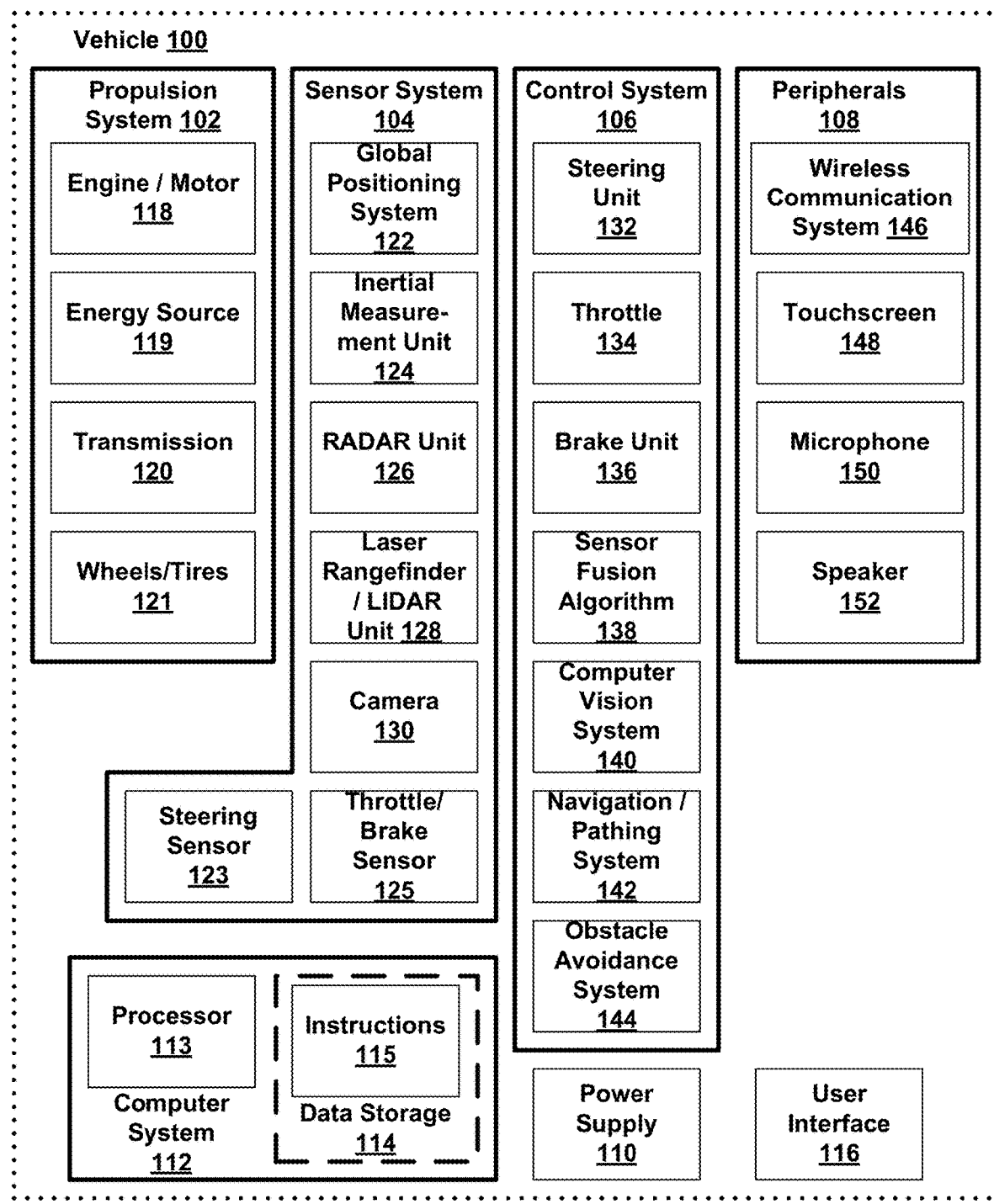
FIG. 1 is a functional block diagram illustrating a vehicle, according to an example implementation.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein. Additionally, in this disclosure, unless otherwise specified and/or unless the particular context clearly dictates otherwise, the terms "a" or "an" means at least one, and the term "the" means the at least one.

Furthermore, the particular arrangements shown in the Figures should not be viewed as limiting. It should be understood that other implementations might include more or less of each element shown in a given Figure. Further, some of the illustrated elements may be combined or omitted. Yet further, an example implementation may include elements that are not illustrated in the Figures.

In practice, an autonomous vehicle system may use data representative of the vehicle's environment to identify an object. The vehicle system may then use the object's identification as a basis for performing another action, such as instructing the vehicle to act in a certain way. For instance, if the object is a stop sign, the vehicle system may instruct the vehicle to slow down and stop before the stop sign, or if the object is a pedestrian in the middle of the road, the vehicle system may instruct the vehicle to avoid the pedestrian.

In some scenarios, vehicle control technology may implement a remote assistance mechanism by which a human operator may work in conjunction with the vehicle system to help identify objects or otherwise assist the vehicle system with controlling the vehicle. For example, remote assistance may help to identify weather and/or hazardous conditions in which the vehicle is operating. Such a mechanism may include a remote computing system that is communicatively linked to the vehicle system, configured for remote assistance, and operated by the human operator. By way of this mechanism, the human operator's input may be taken into account in determining an object's identification, verifying the object's identification, and/or determining an instruction to control the vehicle.

In some implementations, a remote assistance process may be triggered in response to the vehicle system having identified an object with a detection confidence (i.e., an indication of the likelihood that the object has been correctly identified in the environment) that is below a predefined threshold. As an example of the remote assistance process the vehicle system may acquire (e.g., via cameras, LIDAR, radar, and/or other sensors) environment data including an object or objects in the vehicle's environment. The vehicle system may then determine that the detection confidence for the object is below the predefined threshold, and then send, to the remote computing system, the environment data that includes the object, such as in the form of an image of the object, a video of the object, and/or audio from the object. The human operator may provide an input to the remote computing system indicative of a correct identification of the object and/or an instruction to control the vehicle, which the remote computing system may in turn provide to the vehicle system in the form of remote assistance data for the vehicle system to use as a basis to control the vehicle.

In an example remote assistance scenario, the vehicle system may detect the presence of an object on the side of a narrow two-lane road, blocking one of the two lanes, and the object may not be an object that the vehicle system normally recognizes. For instance, the object may be a person near the side of the road that is directing traffic in an atypical manner (e.g., so that oncoming traffic and outgoing traffic share the one open lane). When the vehicle encounters such an object in this scenario, the vehicle system may detect the existence of the object, but the vehicle may have a low confidence in detecting the object. For example, the vehicle system may be unsure whether the person is someone walking into the road, or, if the person is attempting to direct traffic, whether he or she is signaling the vehicle to drive or to stop. In such a scenario, the vehicle system could detect that this is likely an unusual event and send a camera image or video to a human operator who could analyze the situation, confirm what the person is doing, and confirm that the vehicle should stop and wait until it is their turn to proceed. This can help ensure safe operation of the vehicle in a scenario in which detection confidence is low.

The remote computing system may operate by default in a mode that supports remote assistance in the manner discussed above. The default mode of operation may involve receiving, from the vehicle system or an intermediary device, environment data representative of at least one object having a threshold low detection confidence (i.e., a detection confidence that is lower than a predefined threshold) and then, responsive to the at least one object having a threshold low detection confidence, providing remote assistance data to enable the vehicle system to control the vehicle with respect to the at least one object.

In some examples, a remote assistance system may also include a rewind functionality in which a remote assistance operator receives data corresponding to an amount of time before some event that triggers a remote assistance inquiry. Consequently, remote assistance may be performed based on data that was communicated to the remote assistance system before the time that remote assistance is needed.

Mechanisms for remote assistance, such as the rewind functionality described above, may be triggered in a variety of different ways. Accordingly, the present disclosure is directed toward several methods of triggering and operating a remote assistance with a rewind function.

The present disclosure provides methods and systems for remote assistance in which the remote computing system is configured to operate in a rewind mode. Across the various different disclosed embodiments, the rewind remote assistance may be initiated by one or more trigger criteria when the vehicle is stopped, when an object of the environment of the autonomous vehicle has a detection confidence below a threshold, and/or in response to a tactile event.

By way of example, an autonomous vehicle may generally operate without any input or instructions provided by the remote assistance system. However, even though the autonomous vehicle may be operating without input for from the remote assistant system, the autonomous vehicle may continuously or periodically transmit data related to its environment to the remote assistance system. For example, the autonomous vehicle may transmit images, sounds, and/or video recordings that were acquired by the vehicle's sensor system to the remote assistance system. In some implementations, the remote assistance system may store some or all of the data provided by the autonomous vehicle. In other implementations, the remote assistance system may store only a specified amount of data or data related to a specified amount of time.

In response to the autonomous vehicle initiating a remote assistance request, the remote assistance system may provide some or all of the stored data provided by the autonomous vehicle to the remote assistance operator. The remote assistance system may cause the display of images or video and/or audio to the remote operator based on a period of time before the remote assistance request was received. For example, when an autonomous vehicle requests remote assistance, the remote assistance system may provide a predetermined amount of video, such as 15 seconds, from before the request was received. This may allow the remote operator to determine an instruction or an identification to provide to the autonomous vehicle. Within examples, the instruction may be an instruction for execution by the autonomous vehicle and the identification may be a correct identification of an objection having a low confidence of identification.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. In some implementations, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112, data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, laser rangefinder/LIDAR 128, camera 130, steering sensor 123, and throttle/brake sensor 125, among other possible sensors. In some implementations, sensor system 104 may also include sensors configured to monitor internal systems of the vehicle 100 (e.g., $O_2$ monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some implementations, radar 126 may correspond to a mountable radar system configured to obtain measurements of the surrounding environment of vehicle 100.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other implementations, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the implementation, computer system 112 could be operable to monitor many aspects of vehicle 100 and its subsystems. In some implementations, computer system 112 may disable some or all functions of the vehicle 100 based on signals received from sensor system 104.

The components of vehicle 100 could be configured to work in an interconnected fashion with other components within or outside their respective systems. For instance, in an example implementation, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some implementations, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

Figure 2:
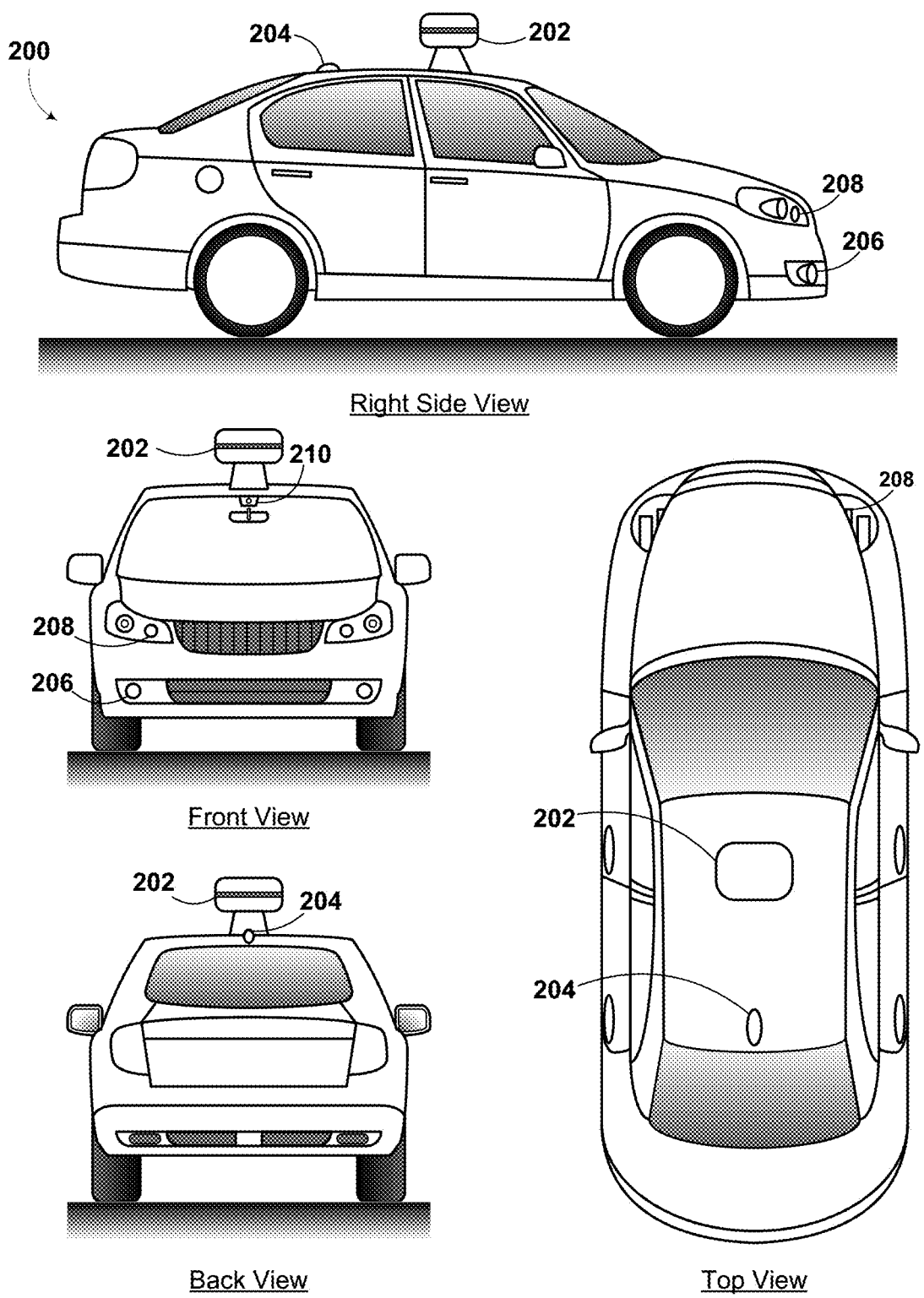
FIG. 2 is a conceptual illustration of a physical configuration of a vehicle, according to an example implementation.

FIG. 2 depicts an example physical configuration of vehicle 200, which may represent one possible physical configuration of vehicle 100 described in reference to FIG. 1. Depending on the implementation, vehicle 200 may include sensor unit 202, wireless communication system 204, radio unit 206, deflectors 208, and camera 210, among other possible components. For instance, vehicle 200 may include some or all of the elements of components described in FIG. 1. Although vehicle 200 is depicted in FIG. 2 as a car, vehicle 200 can have other configurations within examples, such as a truck, a van, a semi-trailer truck, a motorcycle, a golf cart, an off-road vehicle, or a farm vehicle, among other possible examples.

Sensor unit 202 may include one or more sensors configured to capture information of the surrounding environment of vehicle 200. For example, sensor unit 202 may include any combination of cameras, radars, LIDARs, range finders, radio devices (e.g., Bluetooth and/or 802.11), and acoustic sensors, among other possible types of sensors. In some implementations, sensor unit 202 may include one or more movable mounts operable to adjust the orientation of sensors in sensor unit 202. For example, the movable mount may include a rotating platform that can scan sensors so as to obtain information from each direction around the vehicle 200. The movable mount of sensor unit 202 may also be moveable in a scanning fashion within a particular range of angles and/or azimuths.

In some implementations, sensor unit 202 may include mechanical structures that enable sensor unit 202 to be mounted atop the roof of a car. Additionally, other mounting locations are possible within examples.

Wireless communication system 204 may have a location relative to vehicle 200 as depicted in FIG. 2, but can also have different locations within implementations. Wireless communication system 200 may include one or more wireless transmitters and one or more receivers that may communicate with other external or internal devices. For example, wireless communication system 204 may include one or more transceivers for communicating with a user's device, other vehicles, and roadway elements (e.g., signs, traffic signals), among other possible entities. As such, vehicle 200 may include one or more vehicular communication systems for facilitating communications, such as dedicated short-range communications (DSRC), radio frequency identification (RFID), and other proposed communication standards directed towards intelligent transport systems.

Camera 210 may have various positions relative to vehicle 200, such as a location on a front windshield of vehicle 200. As such, camera 210 may capture images of the environment of vehicle 200. As illustrated in FIG. 2, camera 210 may capture images from a forward-looking view with respect to vehicle 200, but other mounting locations (including movable mounts) and viewing angles of camera 210 are possible within implementations. In some examples, camera 210 may correspond to one or more visible light cameras. Alternatively or additionally, camera 210 may include infrared sensing capabilities. Camera 210 may also include optics that may provide an adjustable field of view.

Figure 3A:
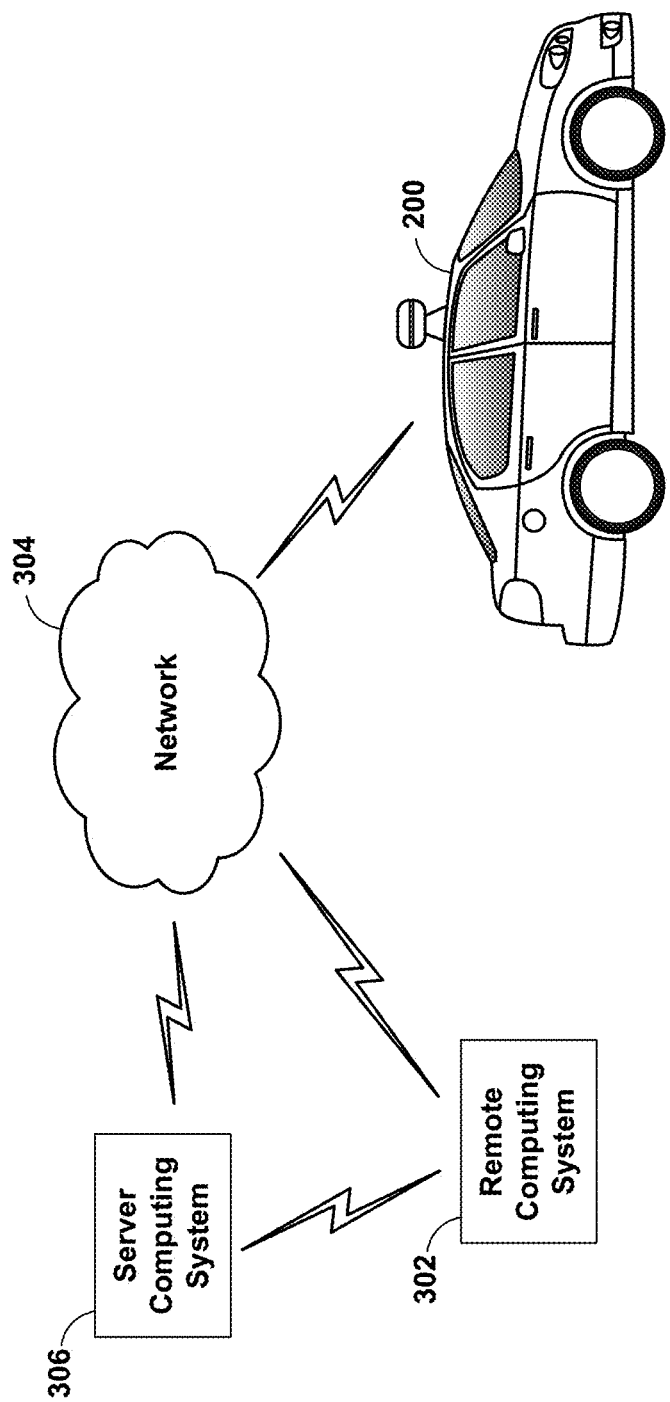
FIG. 3A is a conceptual illustration of wireless communication between various computing systems related to an autonomous vehicle, according to an example implementation.

FIG. 3A is a conceptual illustration of wireless communication between various computing systems related to an autonomous vehicle, according to an example implementation. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous mode that enables a control system to safely navigate vehicle 200 between destinations using sensor measurements. When operating in an autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some implementations, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some implementations, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some implementations of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a remote computing system (e.g., remote computing system 302, or perhaps server computing system 306) may operate in a rewind mode. In general, the rewind mode may function as a means for a human operator (of the vehicle and/or the remote computing system) to provide remote assistance support for the vehicle by accessing information previously obtained by the vehicle. The remote computing system may enable a human operator to provide this support in real-time or less frequently than real-time.

In some implementations, to facilitate remote assistance, including a rewind mode as described herein, a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a camera may be configured to capture still images and/or video. In some implementations, the vehicle may have more than one camera positioned in different orientations. Also, in some implementations, the camera may be able to move to capture images and/or video in different directions. The camera may be configured to store captured images and video to a memory for later processing by a processing system of the vehicle. The captured images and/or video may be the environment data.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distance and position to various reflecting objects may be determined. In some implementations, the vehicle may have more than one radar unit in different orientations. The radar system may be configured to store captured information to a memory for later processing by a processing system of the vehicle. The information captured by the radar system may be environment data.

In another example, a laser range finder may be configured to transmit an electromagnetic signal (e.g., light, such as that from a gas or diode laser, or other possible light source) that will be reflected by a target objects near the vehicle. The laser range finder may be able to capture the reflected electromagnetic (e.g., laser) signals. The captured reflected electromagnetic signals may enable the range-finding system (or processing system) to determine a range to various objects. The range-finding system may also be able to determine a velocity or speed of target objects and store it as environment data.

Additionally, in an example, a microphone may be configured to capture audio of environment surrounding the vehicle. Sounds captured by the microphone may include emergency vehicle sirens and the sounds of other vehicles. For example, the microphone may capture the sound of the siren of an emergency vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some implementations it is desirable to transmit the first electromagnetic radiation signal with a signaling mode that requests a response from devices located near the autonomous vehicle. The processing system may be able to detect nearby devices based on the responses communicated back to the radio unit and use this communicated information as a portion of the environment data.

In some implementations, the processing system may be able to combine information from the various sensors in order to make further determinations of the environment of the vehicle. For example, the processing system may combine data from both radar information and a captured image to determine if another vehicle or pedestrian is in front of the autonomous vehicle. In other implementations, other combinations of sensor data may be used by the processing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the environment to determine at least one object having a detection confidence below a threshold. A processor in the vehicle may be configured to detect various objects of the environment based on environment data from various sensors. For example, in one implementation, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various way depending on the source of the environment data. In some implementations, the environment data may come from a camera and be image or video data. In other implementations, the environment data may come from a LIDAR unit. The vehicle may analyze the captured image or video data to identify objects in the image or video data. The methods and apparatuses may be configured to monitor image and/or video data for the presence of objects of the environment. In other implementations, the environment data may be radar, audio, or other data. The vehicle may be configured to identify objects of the environment based on the radar, audio, or other data.

In some implementations, the techniques the vehicle uses to detect objects may be based on a set of known data. For example, data related to environmental objects may be stored to a memory located in the vehicle. The vehicle may compare received data to the stored data to determine objects. In other implementations, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other implementations, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some implementations, the vehicle may react as if the detected object is present despite the low confidence level. In other implementations, the vehicle may react as if the detected object is not present.

When the vehicle detects an object of the environment, it may also calculate a confidence associated with the specific detected object. The confidence may be calculated in various ways depending on the implementation. In one example, when detecting objects of the environment, the vehicle may compare environment data to predetermined data relating to known objects. The closer the match between the environment data to the predetermined data, the higher the confidence. In other implementations, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some implementations, via a server (e.g., server computing system 306). The human operator of the remote computing system may in turn use the environment data as a basis for responding to the request.

In some implementations, the vehicle and/or another computing entity may include as part of the environment data, a bounding box provided substantially around the object whose identification is at issue (e.g., image data with a box around the object). As such, when the remote computing system receives the environment data, the remote computing system may provide the environment data, including the object in the bounding box or bounding region, for display to the human operator so that the human operator can readily and quickly identify the object in the environment data.

In some implementations, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of vehicle (e.g., a speed and/or direction), among other possible adjustments. As a particular example, if the vehicle detects a sign that the vehicle identifies as a sign that reads "40 kilometers per hour," the vehicle may begin operating as if the identification is correct (e.g., adjust its speed to 40 kilometers per hour), even if the sign is detected as having a confidence below the confidence threshold. At the same time, or perhaps at a later time, the vehicle may also request remote assistance to confirm that the object is in fact a sign that reads "40 kilometers per hour."

In other implementations, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object. As a variation of the example above, if the vehicle detects a sign that the vehicle identifies as a sign that reads "40 kilometers per hour," and the sign is detected as having a confidence at or above the confidence threshold, the vehicle may begin operating in accordance with the detected object (e.g., adjust its speed to 40 kilometers per hour). At the same time, or perhaps at a later time, the vehicle may also request remote assistance to confirm that the object is in fact a sign that reads "40 kilometers per hour." The remote assistance in these other implementations may serve as a precaution or may serve other purposes. The vehicle may be configured to operate in this manner for certain types of objects, such as objects that are more important to vehicle and pedestrian safety (e.g., stop signs, traffic lights, crosswalks, and pedestrians).

In additional implementations, when the object is detected as having a confidence below the confidence threshold, the vehicle, server, or the remote computing system may generate a natural-language question based on the attempt to identify the object, and then trigger the remote computing system to display, or otherwise present to the human operator, the natural-language question. For instance, if the remote computing system generates the question, it may responsively display the question as well. Whereas, if the vehicle or server generates the natural-language question, the vehicle or server may transmit a message to the remote computing system representative of the question, which upon receipt by the remote computing system may trigger the remote computing system to present the question to the human operator.

In some examples, the natural-language question may be, "Is this a stop sign?" In other examples, the natural-language question may take other forms such as, "Is this a construction sign?" Other various natural-language questions may be generated based on the detected object. The natural-language question may be based on a result of the object detection of the object. Additionally or alternatively, the natural-language question may be based on the preliminary identification of the object, so as to ask the human operator to confirm whether the preliminary identification is correct. In either case, the natural-language question may not include the correct identity of the object in some scenarios. For instance, if the vehicle has threshold low confidence that the object is a traffic signal with a green light, even though the object in reality is a traffic signal with a red light, the natural-language question may read "Is the light in this traffic signal green?" In yet some further examples, the object may be a misidentification based on roadside images. For example, a billboard may contain an image of a stop sign that the may be erroneously detected as a road-side stop sign. Other examples are possible as well.

When receiving the environment data, the remote computing system may store the data in preparation for receiving a remote assistance request. The images, sounds, and/or video recordings that were acquired by the vehicle's sensor system may be stored in a memory of the remote assistance system. When stored in the memory of the remote assistance system, the data may be labeled with the vehicle that transmitted the data to the remote assistance system. Thus, when the vehicle requests remote assistance, the remote assistance system may be able to retrieve data previously transmitted to the remote assistance system. The remote assistance system may store some or all of the data provided by the autonomous vehicle. Additionally, the remote assistance system may store only a specified amount of data or data related to a specified amount of time and/or distance traveled. For example, the remote assistance system may only store the data for a period of time, such as 5 minutes. After the 5-minute period of time, the remote assistance system may delete some or all of the data. In other examples, the remote assistance system may only store the data for a predetermined distance, such as 200 meters.

While the autonomous vehicle operates, there may be situations where the vehicle is stopped for an extended period of time. For example, the autonomous vehicle may stopped on the side of a road to wait for passengers to load and/or unload. The autonomous vehicle may stop in a parking spot, double park, wait in a loading zone, and/or stop in another location. In these instances, relevant data may be based on the distance traveled rather than a predetermined amount of time. After the 5-minute period of time, the remote assistance system may delete some or all of the data. In practice, the remote assistance system may remove the label of which autonomous vehicle transmitted the data after the period of time. By removing the label, the data is no longer identifiable to a specific vehicle. In some other examples, the remote assistance system may remove a different portion of the data after the period of time.

When remote assistance is requested, the remote assistance system may present the human operator with some or all of the environment data. The remote computing system may also provide the natural-language question. The data presented to the operator may correspond to data for a predetermined period of time before remote assistance was requested. In some examples, when remote assistance is requested the operator may receive data for the previous 15 seconds before assistance was requested. In various embodiment, the period of time for which data is provided may vary. In some embodiments, the period of time may change based on the specific situation in which remote assistance is requested.

The remote computing system may present the environment data and/or the natural-language question in various ways. For example, the remote computing system may display, on a touchscreen, a graphical user interface (GUI) including captured images or video of the object. The GUI may also include the natural-language question and/or a bounding box associated with the object. Additionally or alternatively, the remote computing system may play, via a speaker of the remote computing system, an audio file representative of the natural-language question. In another example, the remote computing system may play, via the speaker, an audio file associated with the object (e.g., a siren sound from what may be an ambulance), and also present the natural-language question to the human operator via the speaker and/or the GUI. Other examples are possible as well.

To enable the human operator to provide input relating to the environment data, and thereby effectively respond to the request for remote assistance, the remote computing system may include an interface for receiving input, such as a keyboard, touchscreen, mouse, touchpad, microphone, etc.

In some implementations, the remote computing system may be configured to enable the human operator to provide an input indicating a correct identification by the vehicle, or perhaps an input indicating that the vehicle identified the object incorrectly. For example, the remote computing system may provide an image of a stop sign and a natural-language question that asks "Is this a stop sign?" The human operator may then input a response indicative of a "Yes" or "No" answer to that question based on his or her perception of the image.

Additionally or alternatively, in other implementations, the remote computing system may be configured to enable the human operator to provide an input representative of an instruction to control the vehicle. For example, if the human operator perceives the environment data to include an image of a stop sign and the natural-language question asks "Is this a stop sign?", the human operator may input an instruction to control the vehicle to stop at the stop sign (e.g., in scenarios where the vehicle has just recently detected the stop sign and is awaiting quick remote assistance feedback) or may input an instruction to control the vehicle to stop at the next stop sign that resembles the stop sign that is represented in the environment data. As another example, the remote computing system may provide the human operator with multiple options for instructing the vehicle. For instance, the remote computing system may display two GUI elements on a touchscreen representing options from which the human operator may choose: "Yes, this is a stop sign. Stop at the stop sign," or "No, this is not a stop sign. Do not stop." Other examples are possible as well.

In some implementations, the remote computing system may enable the human operator to perform other actions in order to correctly identify the object. For example, if the object at issue is an orange construction cone, the human operator may enter via a keyboard, or speak via a microphone, a response including the words "construction cone." This could occur in scenarios where no natural-language question is presented, but where the human operator may still correctly identify the object. As another example, if the object at issue is an orange construction cone, the human operator may browse the Internet on the remote computing system for another image of a construction cone and include the image in the human operator's remote assistance response. Other examples are possible as well.

At some point, the remote computing system may transmit, to the vehicle, remote assistance data that includes a representation of the human operator's feedback regarding the environment data, whether in the form of an instruction to control the vehicle, a correct identification of the object at issue, and/or some other form of feedback. The remote computing system may transmit the remote assistance data wirelessly or by some other manner.

Upon receipt of the remote assistance data by the vehicle, or perhaps sometime thereafter, the vehicle may control itself to operate in a manner that is in accordance with the remote assistance data. For example, the vehicle may alter its movement, such as by stopping the vehicle, switching the vehicle to a human-controlled mode, changing a velocity of vehicle (e.g., a speed and/or direction), and/or another movement alteration.

In some example scenarios, the remote assistance data may indicate the presence of an object that the vehicle was not aware of before seeking remote assistance (e.g., an object that the vehicle had not yet encountered). In other examples, the remote assistance data may indicate that the object is a different type of object than the vehicle had identified. In yet other examples, the remote assistance data may indicate that an object identified by the vehicle was not actually present in the environment (e.g., a false positive). In each of these examples, the remote assistance data provides information to the vehicle that has different objects than the autonomous vehicle determined. Therefore, to continue safe operation of the autonomous vehicle, the control of the vehicle may be altered.

Figure 3B:
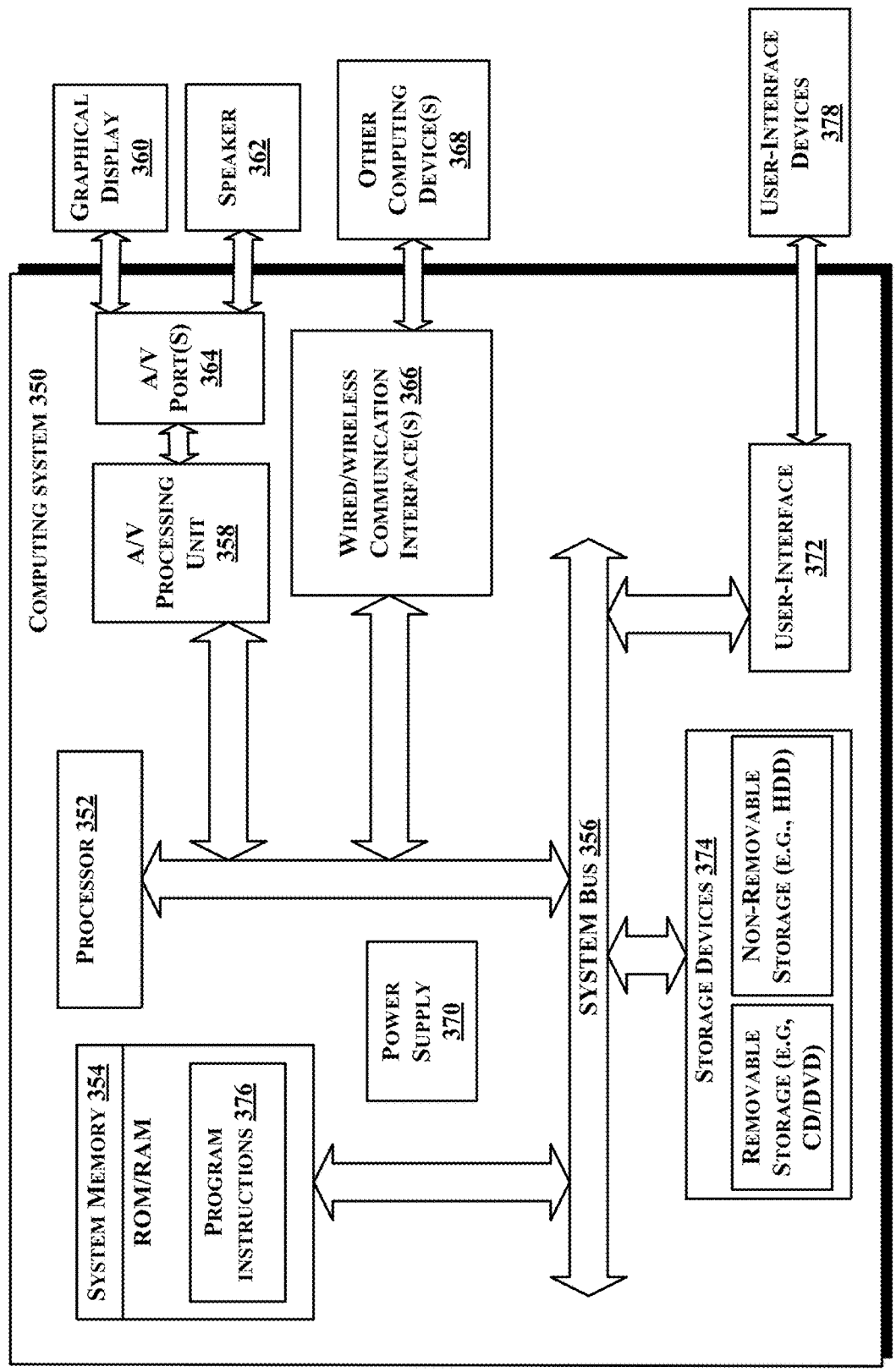
FIG. 3B shows a simplified block diagram depicting example components of an example computing system.

FIG. 3B shows a simplified block diagram depicting example components of an example computing system 350. This example computing system 306 could correspond to the remote computing system 302 and/or the server computing system 306 shown in FIG. 3A.

Computing system 350 may include at least one processor 352 and system memory 354. In an example embodiment, computing system 350 may include a system bus 356 that communicatively connects processor 352 and system memory 354, as well as other components of computing system 350. Depending on the desired configuration, processor 352 can be any type of processor including, but not limited to, a microprocessor (µP), a microcontroller (µC), a digital signal processor (DSP), or any combination thereof. Furthermore, system memory 354 can be of any type of memory now known or later developed including but not limited to volatile memory (such as RAM), non-volatile memory (such as ROM, flash memory, etc.) or any combination thereof.

An example computing system 350 may include various other components as well. For example, computing system 350 includes an A/V processing unit 358 for controlling graphical display 360 and speaker 362 (via A/V port 364), one or more communication interfaces 366 for connecting to other computing devices 368, and a power supply 370. Graphical display 360 may be arranged to provide a visual depiction of various input regions provided by user-interface module 372. For example, user-interface module 372 may be configured to provide a user-interface, and graphical display 360 may be configured to provide a visual depiction of the user-interface. User-interface module 372 may be further configured to receive data from and transmit data to (or be otherwise compatible with) one or more user-interface devices 378.

Furthermore, computing system 350 may also include one or more data storage devices 374, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium now known or later developed that can be used to store the desired information and which can be accessed by computing system 300.

Figure 6A:
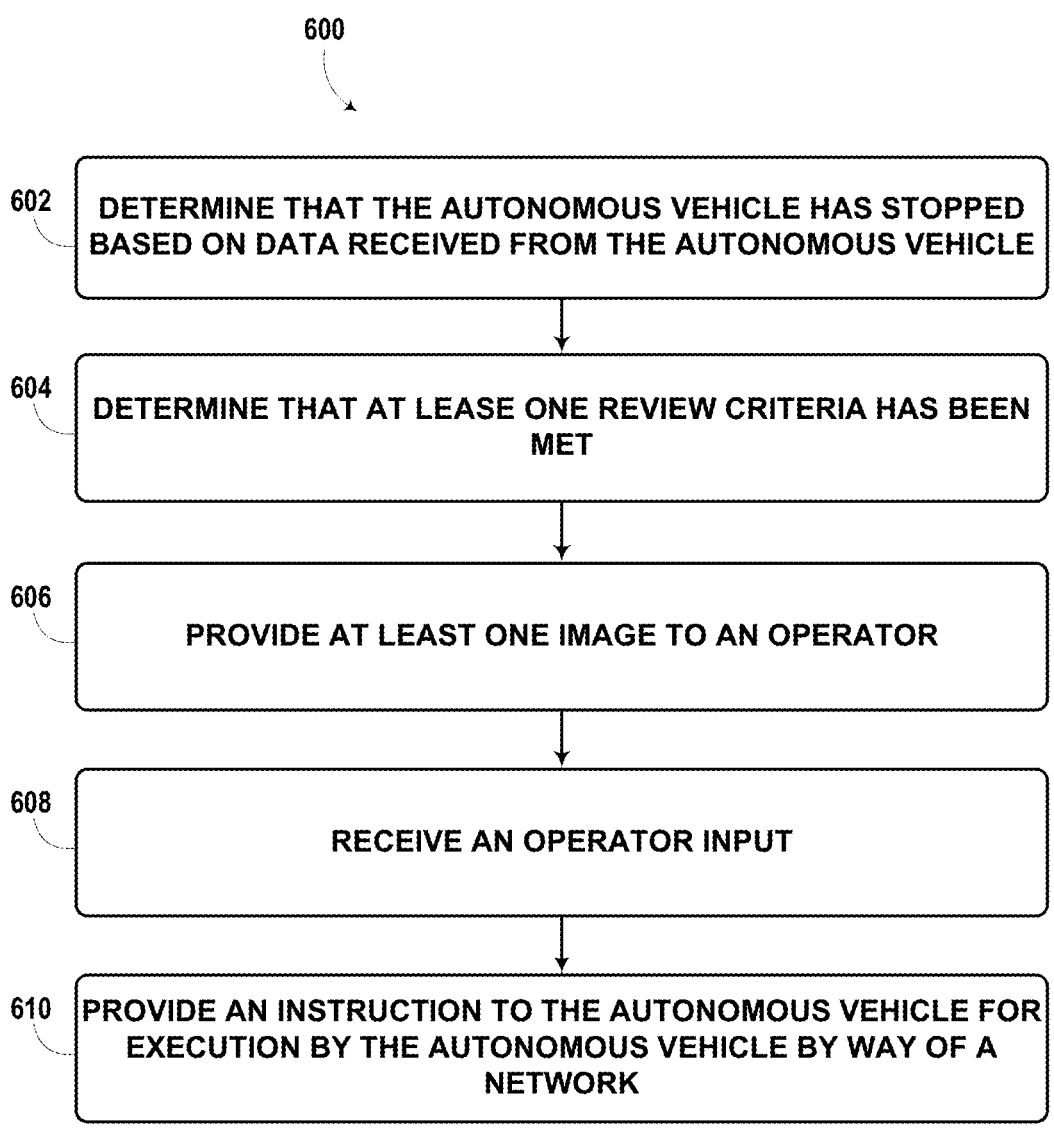
FIG. 6A is a flow chart of a method, according to an example implementation.
Figure 6B:
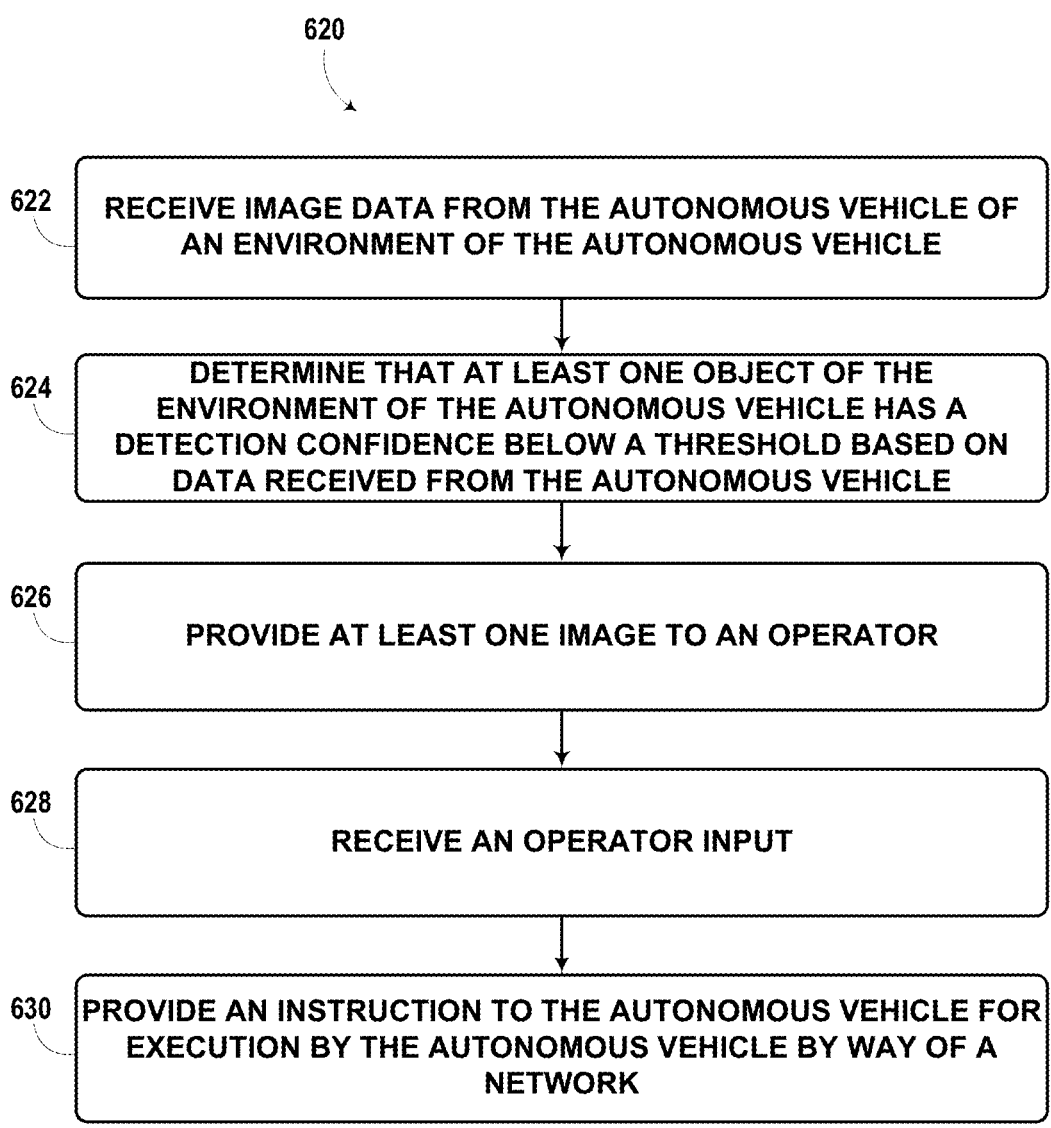
FIG. 6B is a flow chart of a method, according to an example implementation.
Figure 6C:
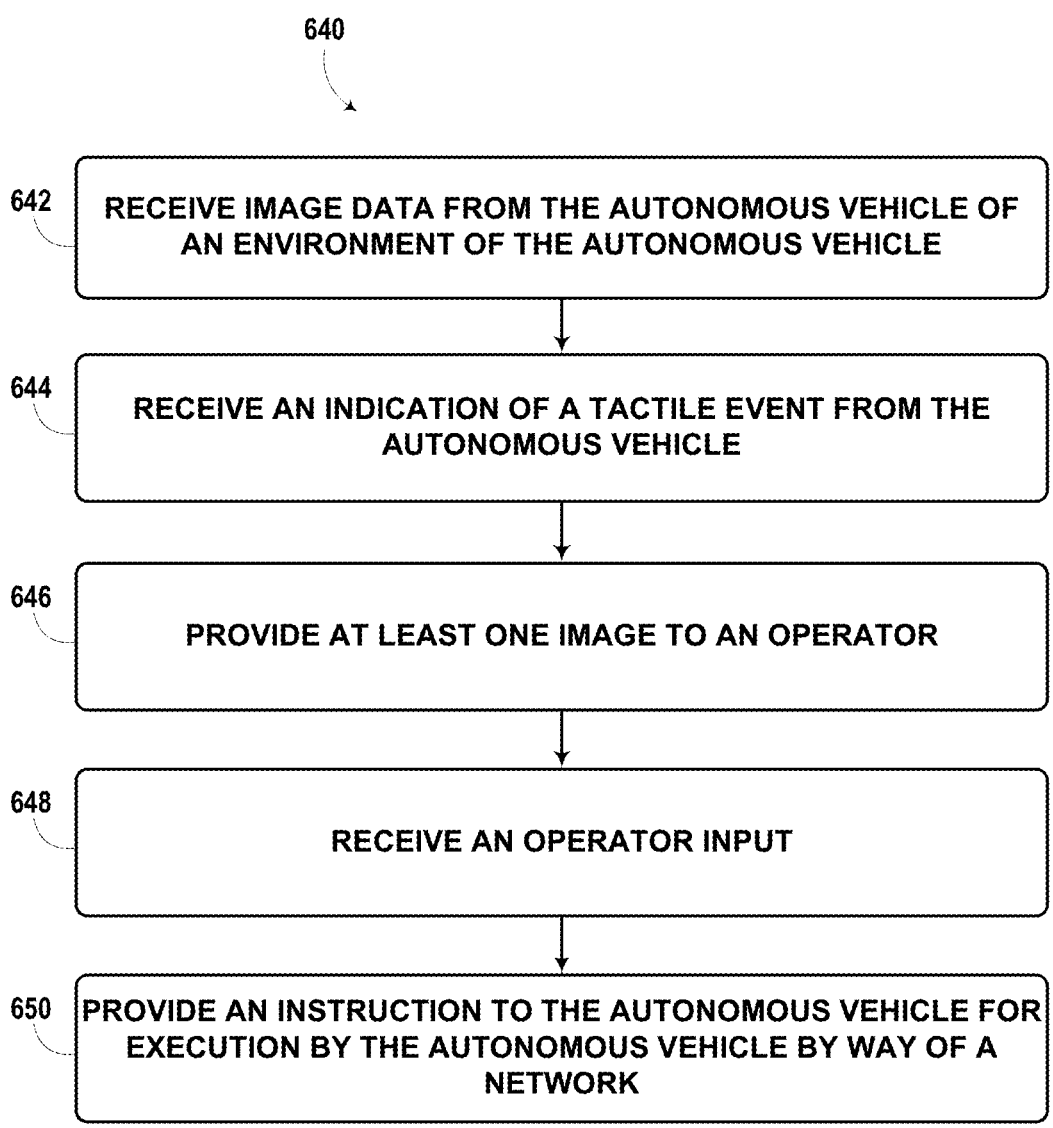
FIG. 6C is a flow chart of a method, according to an example implementation.

According to an example embodiment, computing system 350 may include program instructions 376 that are stored in system memory 354 (and/or possibly in another data-storage medium) and executable by processor 352 to facilitate the various functions described herein including, but not limited to, those functions described with respect to FIG. 6A-6C. Although various components of computing system 350 are shown as distributed components, it should be understood that any of such components may be physically integrated and/or distributed according to the desired configuration of the computing system.

Figure 4A:
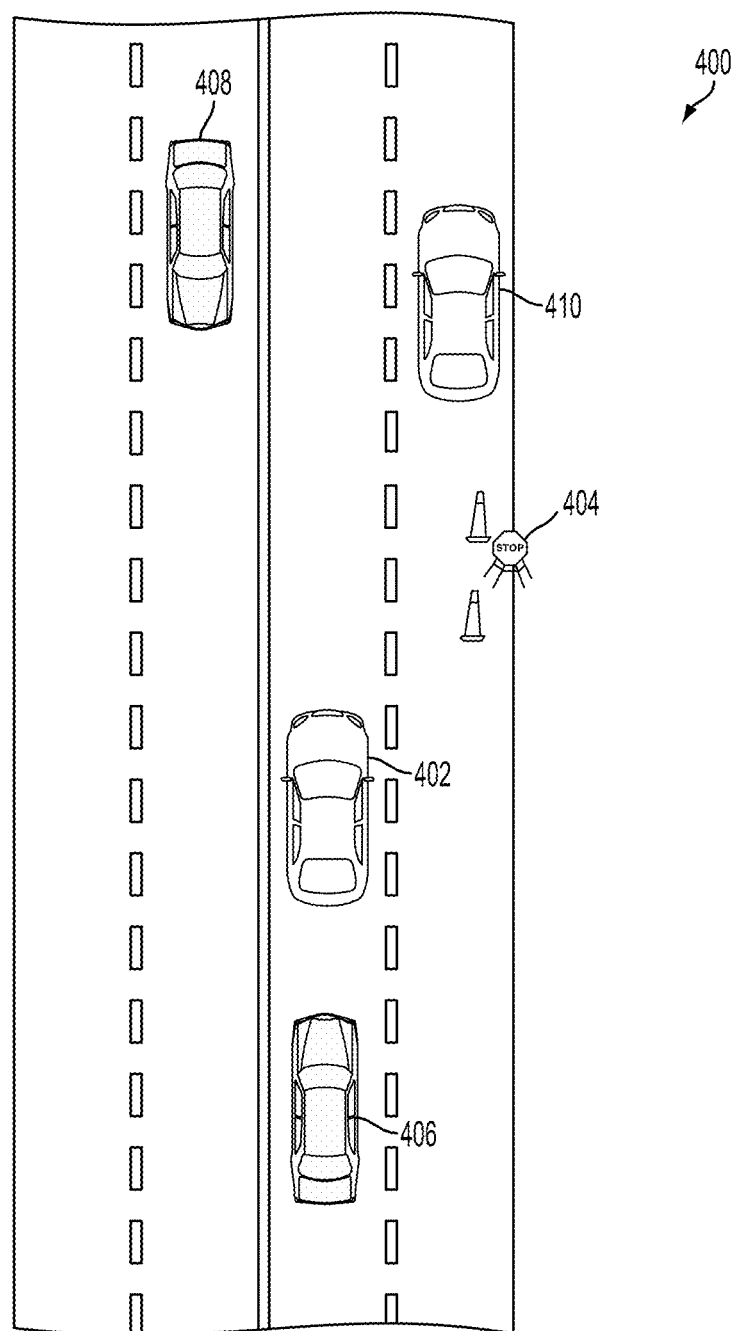
FIG. 4A illustrates a top view of an autonomous vehicle operating scenario, according to an example implementation.

FIG. 4A illustrates a top view of a scenario encountered by an autonomous vehicle, in accordance with an example implementation. As shown, an autonomous vehicle 402 may be operating within an environment 400 containing other vehicles 406, 408, and 410. The autonomous vehicle 402 may be operating in an autonomous mode with a lane of travel when it approaches an obstacle in the road, in this example a temporary stop sign 404.

Figure 4B:
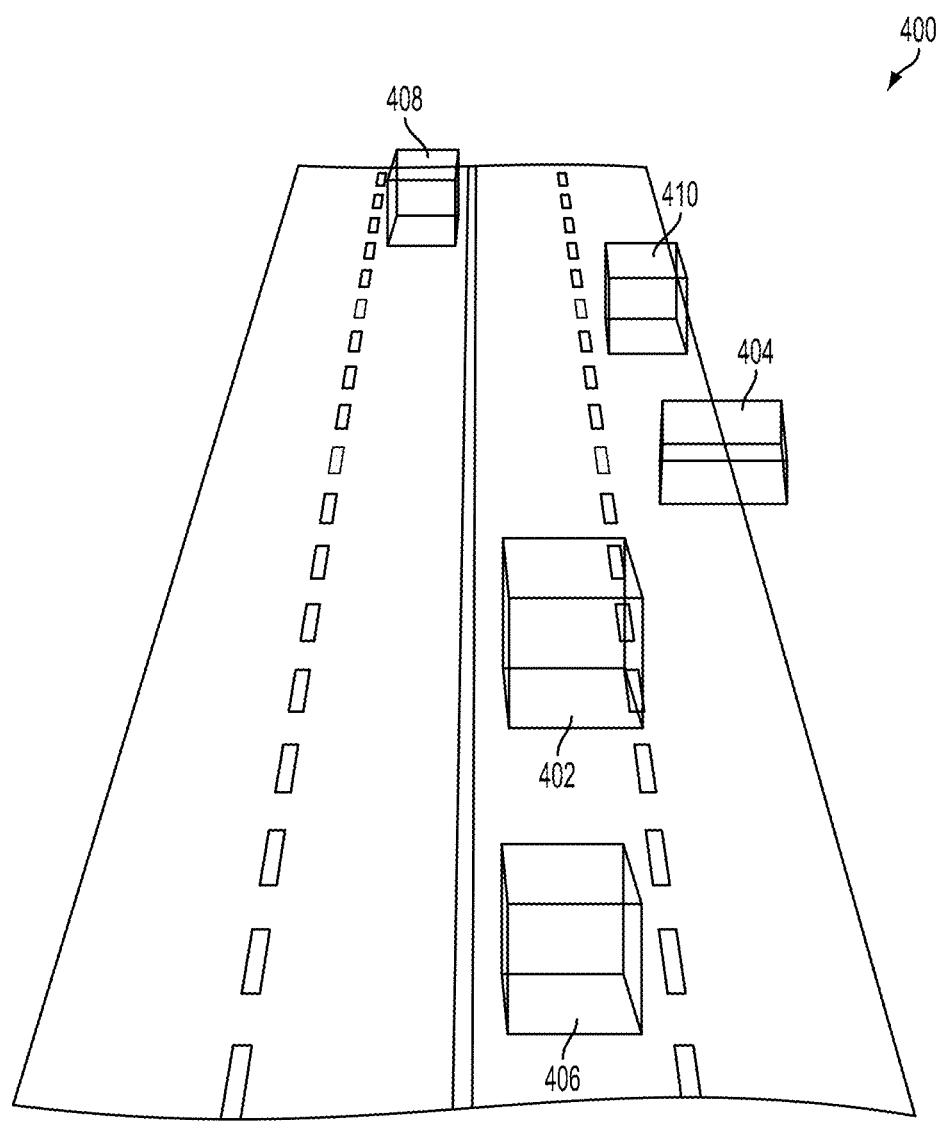
FIG. 4B illustrates a sensor data representation of the scenario from FIG. 4A, according to an example implementation.

The autonomous vehicle 402 may create a representation of its environment 400 based on any combination of possible types of sensor data as described above. FIG. 4B illustrates a representation of the environment from FIG. 4A based on sensor data collected by the vehicle, according to an example implementation. In some examples, the representation may not be a perfect copy of the environment. For instance, some of the sensors may be blocked in certain directions or some of the sensor data may be distorted. Additionally, some objects may be abstracted into geometric shapes, such as the representations of the vehicles 406, 408, and 410 or the temporary stop sign 404 shown in the figure. The autonomous vehicle 402 may identify objects or other aspects of the environment with varying levels of precision.

The situation depicted in FIG. 4A and FIG. 4B may be a situation in which the vehicle's confidence level drops below a predetermined threshold level. The drop in confidence level may be based on one or more different factors about the vehicle's operation and/or the vehicle's view of the environment. For example, the vehicle 402 may not be able to create a complete sensor representation of its environment because the temporary stop sign 404 may be obstructing its views of aspects of the environment (e.g., other cars). Additionally, the vehicle 402 may not be able to identify with confidence one or more objects within the environment, possibly including the temporary stop sign 404. Also, aspects of the vehicle's own operation may also cause its confidence level to drop. For instance, the vehicle may have stopped behind the temporary stop sign 404, and may have remained stuck there for a certain period of time, which may trigger a warning from one of the vehicle's systems. In some examples, if the vehicle 402 is stuck for more than a predetermined set amount of time (e.g., 1 minute or 5 minutes), its confidence level may begin to drop. Other factors may contribute to the vehicle's determination that its confidence in how to proceed (e.g., whether to continue waiting or to do something else) has fallen to a level where the vehicle should request remote assistance.

Figure 4C:
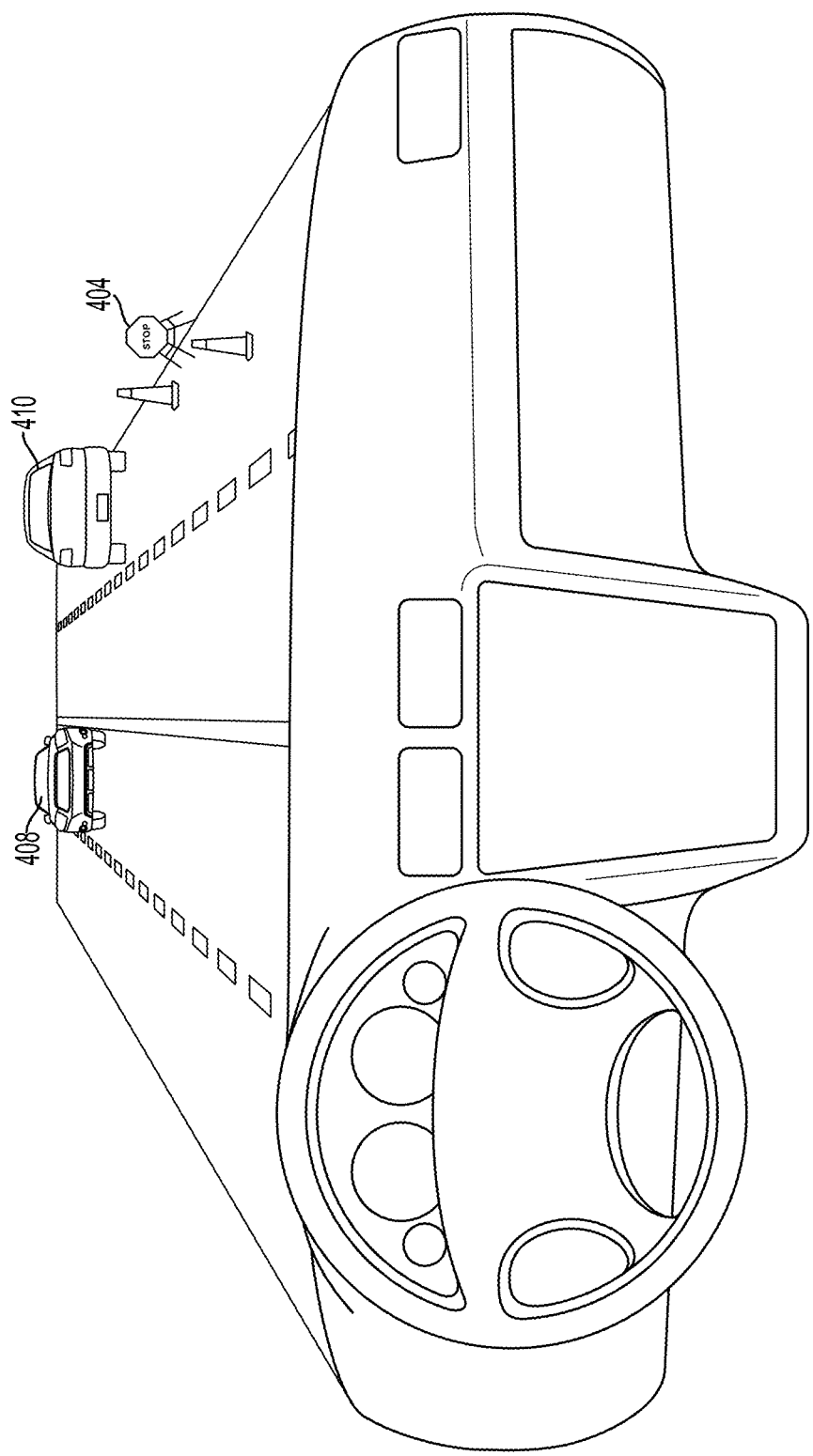
FIG. 4C illustrates a video feed taken from the vehicle in FIG. 4A, according to an example implementation.

FIG. 4C shows a video stream of the environment 400 of autonomous vehicle 402 from the point-of-view of the autonomous vehicle 402. For example, the autonomous vehicle 402 may be equipped with one or more video cameras which capture video streams of a portion of the environment 400. This environment data may be transmitted along with the request with assistance for use by the human operator. In this example, the portion of the environment 400 captured in the video stream includes the temporary stop sign 404 as well as parts of cars 408 and 410 that are not obstructed by the temporary stop sign 404. In some examples, the cameras may be moveable (and possibly may be controlled directly or indirectly by a remote operator) in order to capture video of additional portions of the environment 400 in order to resolve certain scenarios.

In further examples, the request for assistance may additionally include one or more suggested autonomous operations for the vehicle to take in the identified situation. For example, referring back to the scenario described with respect to FIG. 4, the vehicle may transmit options that may include holding position or attempting to pass the obstacle on the left. In one example, the vehicle may send a single suggested operation in order to receive verification of its proposed course of action, and may hold the vehicle's position until a response is received. In other examples, the vehicle may send a set of two or more proposed options for the human operator to select from. In some cases, the vehicle may not be able to propose a course of action. In such examples, the human guide may be able to propose a course of action for the vehicle to take, or a set of two or more possible courses of action.

In additional examples, the request for assistance may involve multiple parts. For example, the vehicle may ask a series of questions of the human operator in order to determine how to proceed with operation. For example, a user interface may include a natural-language question to aid in providing the input to the autonomous vehicle. For example, referring to the situation depicted in FIG. 4A, the vehicle 402 may first request assistance in order to identify the obstacle in the road as a temporary stop sign 404. The vehicle 402 may then make a second request in order to determine how best to proceed given that the obstacle has been identified as a temporary stop sign 404. Other more complicated discourses between the vehicle 402 and remote operator are possible as well.

Figure 4D:
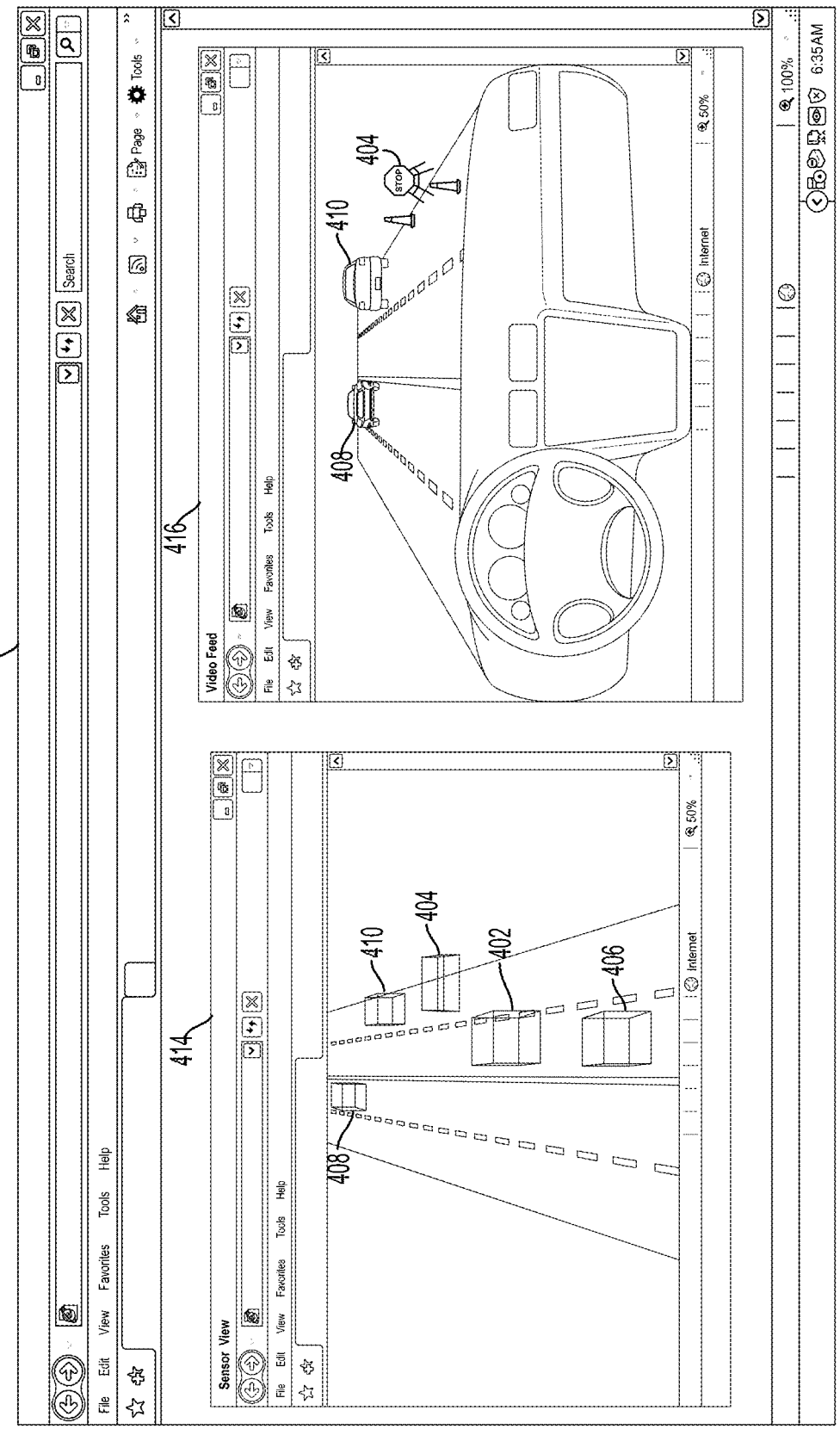
FIG. 4D illustrates a graphical user interface containing the sensor data representation from FIG. 4B and the video feed from FIG. 4C, according to an example implementation.

FIG. 4D shows an example GUI on a remote computing system that may be presented to a human operator. The GUI 412 may include separate sub-windows 414 and 416. The first sub-window 414 may include the vehicle's sensor data representation of its environment, such as described above with respect to FIG. 4B. The second sub-window 416 may include a video stream of a portion of the environment, such as described above with respect to FIG. 4C. Accordingly, the human operator may be able to compare the vehicle's understanding of its environment with the video stream to verify the vehicle's representation of its environment and/or to verify or suggest a planned course of action of the vehicle.

Figure 4E:
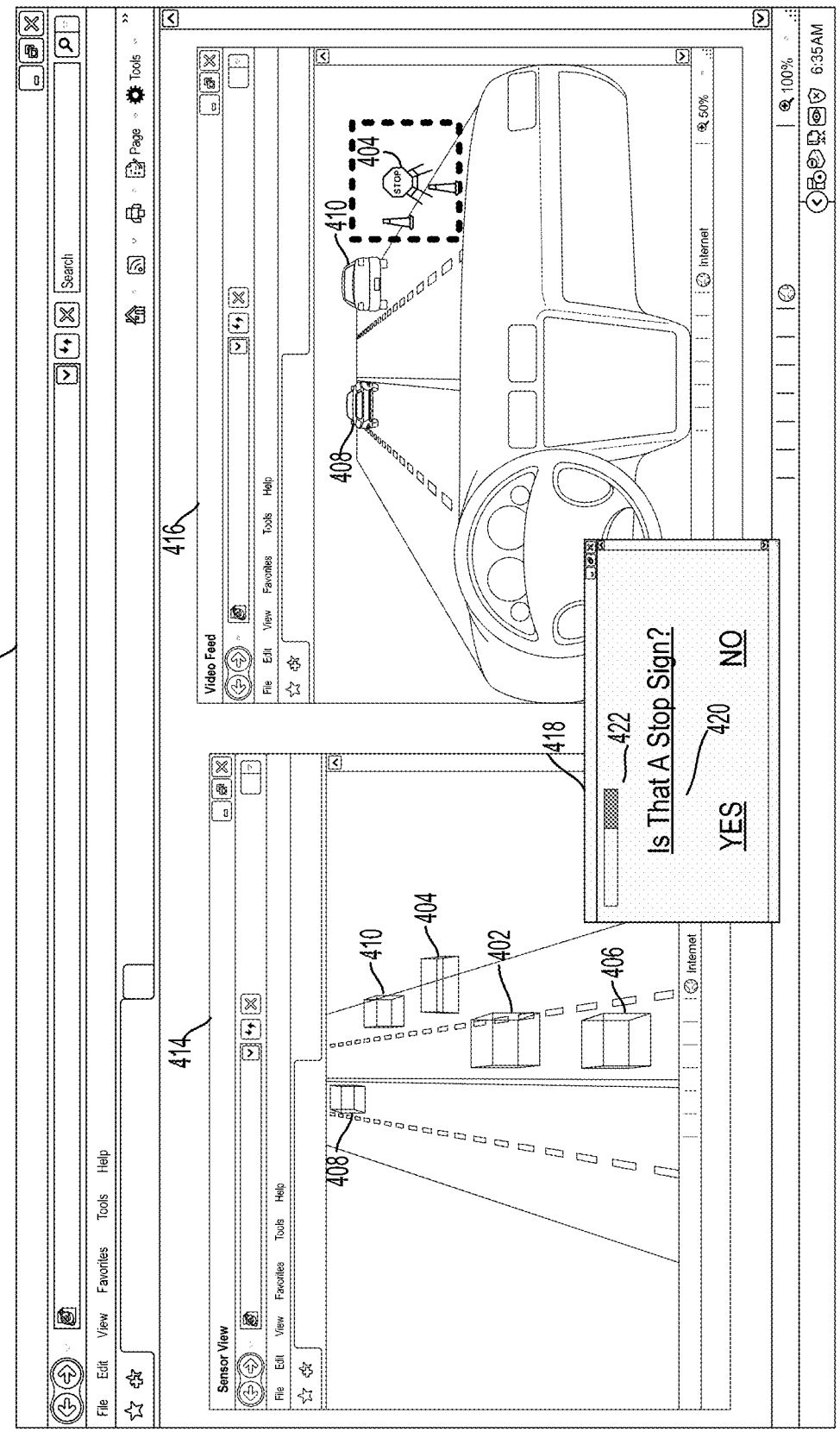
FIG. 4E illustrates the GUI from FIG. 4D including a control menu, according to an example implementation.

The human operator may be presented with a GUI that contains a control menu that enables a human operator to send a response to a vehicle indicating a proposed autonomous mode of operation. For example, FIG. 4E shows an example GUI that contains a first sub-window showing the vehicle's sensor data representation of its environment and a second sub-window showing a video stream of a portion of the vehicle's environment, such as described above with respect to FIG. 4D. FIG. 4E additionally contains a control menu 418 that may allow a human operator to respond to a natural-language question. Depending on the type of response provided to the vehicle, the control menu 418 may allow the operator to input guidance to the vehicle in a number of different ways (e.g., selecting from a list of operations, typing in a particular mode of operation, selecting a particular region of focus within an image of the environment, etc.).

In the example depicted in FIG. 4E, the human operator may indicate a natural-language question 420 to identify the object identified as the temporary stop sign 404. Additionally, when an identification is confirmed, the identification may be added to a global map. When the identification is added to the global map, other vehicles may not have to request an identification of the object in the future. The control menu 418 may additionally contain a latency bar 422 indicating how old the received sensor data is, which may affect the human operator's response.

The response to the request for assistance may be received in a number of different ways. In implementations where the request for assistance was sent to a remote computing system not located within the vehicle, the response may be received wirelessly through a communication system located within the vehicle. In other implementations, such as those where the request for assistance was sent to a passenger located with the vehicle, the response may be received when the passenger enters an autonomous operation into a GUI of a computer system located within the vehicle. A passenger may be able to instruct the vehicle in other ways as well, such as through voice commands or through a handheld mobile device. Other modes of transmitting and/or receiving the request for assistance and/or the response to the request may also be used.

Figure 5:
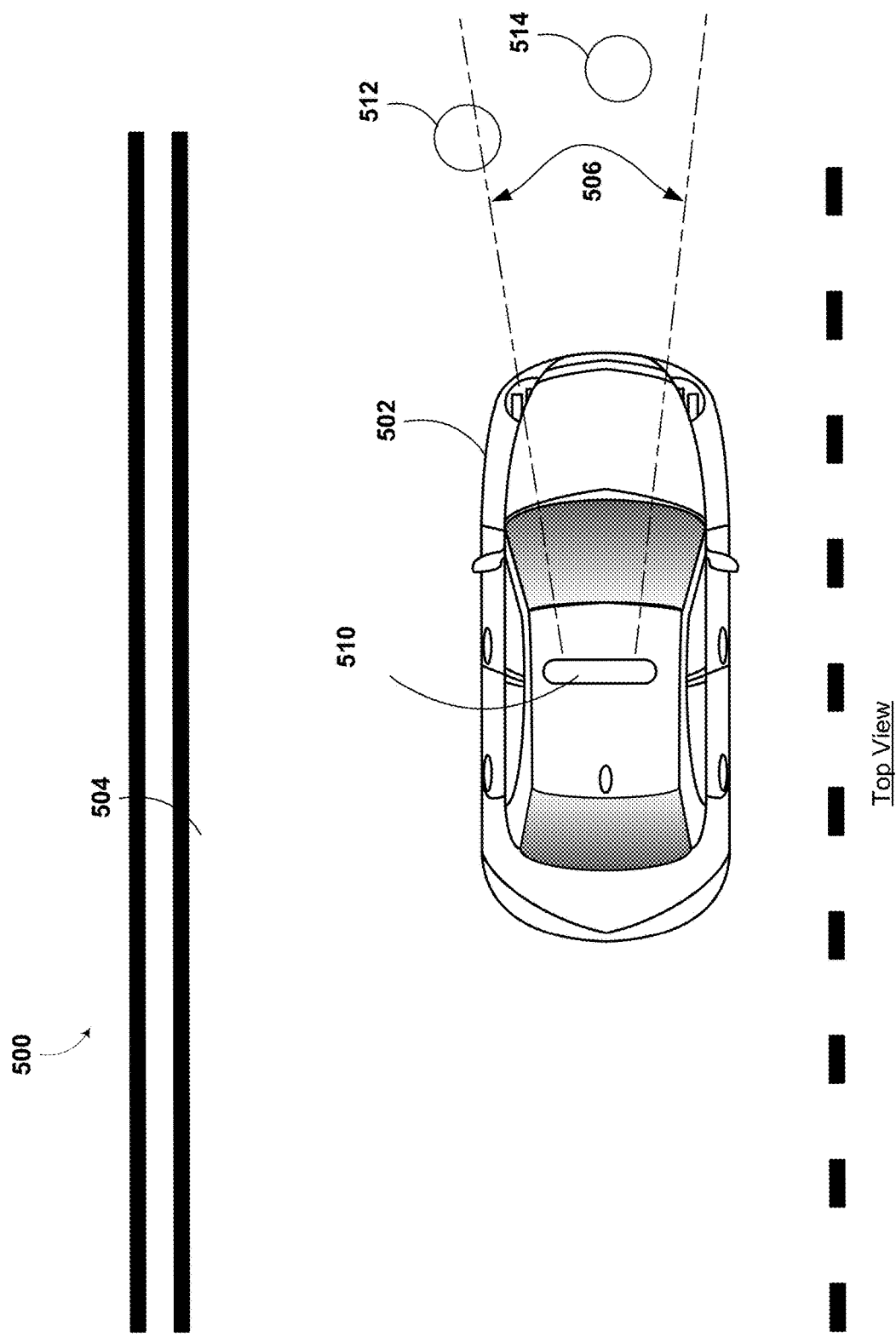
FIG. 5 is a top view of an autonomous vehicle during operation, according to an example implementation.

FIG. 5 illustrates an example scenario 500 involving a vehicle 502 traveling down a roadway 504. Vehicle 502 may be operating in an autonomous mode. Further, the vehicle 502 may be configured with a sensor unit 510. In one example, the sensor unit 510 may have a sensor, such as a camera, that has a field of view 506. The field of view 506 may correspond to a region of where the camera may be able to capture an image. In another implementation, sensor unit 510 may include a radar unit. The field of view 506 may correspond to a region over which the radar unit may send and receive signals. In other implementations, the field of view 506 may not be limited to a single region in front of the vehicle, but instead may correspond to the entire region (e.g., 360-degrees) around the vehicle. FIG. 5 illustrates an example scenario 500 in which the sensor unit uses a camera to obtain data about the environment of the vehicle. The description of FIG. 5 can also be used with other sensors, not just an optical sensor like a camera.

As one example implementation, as shown FIG. 5, there may be two environmental objects at least partially within the field of view 506 of a vehicle 502. In this example, it is assumed that the field of view 506 is that of an optical sensor, such as a camera. The camera of the sensor unit 510 may take a picture or video. This picture video will be analyzed to determine objects of the environment.

When the camera in the sensor unit 510 captures a video or image, a first object 514 may fall completely within the field of view 506. A second object 512 may only partially be located within the capture picture or video. When a processing system in the vehicle 502 analyzes the picture or video, it may be able to successfully identify an object, such as the first object 514. However, the processing system may not be able to successfully identify the second object 512 (or it may identify the object 512 with a low confidence). The processing system may not be able to successfully identify the second object 512 for many different reasons. In some implementations, the data of the environment may not include enough information to successfully identify the second object 512 automatically. For example, the second object 512 may be a street sign. An image captured by the vehicle may have a portion of the street sign cut off. The detection system of the vehicle may not be able to correctly identify the cut off street sign. In another example, an object may be partially obscured, so automatic identification may not work accurately. In still another implementation, an object may be deformed or damaged in such a way that the detection system of the vehicle may not be able to accurately detect the object.

Thus, the processing system may communicate data associated with the captured image or video for further processing. When a human operator views the resulting image or video, he or she may be able to successfully identify the second object 512, despite the second object 512 only partially being in the field of view 506. In other implementations, rather than communicating data to a human operator, the vehicle may communicate data to a more powerful computer system, which is remotely located, for further processing.

Although FIG. 5 is described with respect to pictures and video, the sensor unit 510 may have other sensors, which capture data that is not visible light. Therefore, the disclosed methods and apparatuses are not limited to just optical data collection. Additionally, the identification shown in FIG. 5 was described as having a misidentification due to the second object 512 only partially being within the field of view. In some implementations, a misidentification can occur even though the full object is located in an image or video.

FIGS. 6A-6C show flow charts of different methods for providing remote assistance for an autonomous vehicle, according to example implementations. Methods 600, 620, and 640 of FIGS. 6A-C respectively, may be performed independently, simultaneously, or sequentially, in various different examples. Methods 600, 620, and 640 represent example methods that may include one or more operations as depicted by one or more of blocks 602-610, each of which may be carried out by any of the systems shown in FIGS. 1-3B, among other possible systems. Each of the operations may also be carried out in accordance with the implementations described with regard to FIGS. 4A-E and FIG. 5. In an example implementation, a computing system such as remote computing system 302 performs the illustrated operations, although in other implementations, one or more other systems (e.g., server computing system 306) can perform some or all of the operations.

Those skilled in the art will understand that the flowcharts described herein illustrates functionality and operations of certain implementations of the present disclosure. In this regard, each block of the flowcharts may represent a module, a segment, or a portion of program code, which includes one or more instructions executable by one or more processors for implementing specific logical functions or steps in the processes. The program code may be stored on any type of computer readable medium, for example, such as a storage device including a disk or hard drive.

In addition, each block may represent circuitry that is wired to perform the specific logical functions in the processes. Alternative implementations are included within the scope of the example implementations of the present application in which functions may be executed out of order from that shown or discussed, including substantially concurrent or in reverse order, depending on the functionality involved, as would be understood by those reasonably skilled in the art. Within examples, any system may cause another system to perform one or more of the operations (or portions of the operations) described below.

In line with the discussion above, a computing system (e.g., remote computing system 302 or server computing system 306) may operate in a rewind mode as shown by method 600. As shown in FIG. 6A, at block 602, the computing system operates by determining that the autonomous vehicle has stopped based on data received from the autonomous vehicle. In some examples, the autonomous vehicle may report its velocity information to the computing system. Based on reported velocity information, the computing system may determine if the autonomous vehicle is stopped. In some other examples, the autonomous vehicle may provide image and/or video data to the computing system. The computing system may analyze the image and/or video data to determine if the autonomous vehicle is stopped. As previously discussed, the vehicle may be stopped awaiting the loading and/or unloading of vehicle passengers. In some examples, a vehicle may be stuck and await a command before moving again. The term stuck generally may mean that a vehicle is not sure how to proceed until a further command is received.

In some examples, block 602 further includes periodically determining if the vehicle is stopped and/or determining if the vehicle has been stopped for a predetermined threshold period of time. The predetermined threshold may be determined based on an environment or a situation in which the autonomous vehicle is located. For example, in a situation where the vehicle is double parked, the threshold may be 15 seconds. In another example, when the vehicle is blocking a driveway, the threshold may be 30 seconds. In some further examples, the computing system may include machine learning algorithms that can learn various new situations and an associated amount of time for the predetermined threshold.

At block 604, the computing system operates by determining that one or more review criteria have been met. The one or more review criteria may take many different forms. In one example, at least one of the one or more review criteria relates to a change in the environment around the vehicle. Changes in the environment may include a person approaching the vehicle, another vehicle approaching the vehicle, a bicycle approaching the vehicle, or other environmental changes. In another example, at least one of the one or more review criteria relates to an audio signal, such as a car horn or a siren. In yet another example, at least one of the one or more review criteria relates to a passenger request. In yet a further example, a review criterion may relate to a period of time. For example, the vehicle being stopped for a predetermined period of time may trigger the review criterion. In such an example, the predetermined period of time may be one minute. After each minute the vehicle is stopped, the review criterion may trigger remote assistance. Other periods of time may be used as well. In some further examples, the period of time may repeat. Therefore, the review criterion may be met each minute (or other period of time) after the vehicle has been stopped. The period of time may also change and may not repeat with the same amount of time. Other types of review criteria are possible as well.

At block 606, in response to the one or more review criteria being met, the computing system operates by providing at least one image to an operator. The computing system may provide images or video (i.e. a plurality of images) to an operator after the review criteria is met. The images or video provided to the operator may be images or video that was previously received from the autonomous vehicle. The video or images provided to the operator may correspond to a predetermined period of time before the review criteria was met. The predetermined period of time may be based on a context in which the one or more review criteria was or were met. Therefore, in effect, the operator sees images or videos leading up to the cause of the review criteria being met.

In practice, providing images or videos leading up to the cause of the one or more review criteria being met may allow the operator to determine a context of the review criteria being met. For example, an autonomous vehicle may be parked at the end of a driveway waiting for a passenger pickup. The one or more review criteria may relate to another vehicle attempting to leave the driveway and pulling toward the autonomous vehicle (and/or honking a horn). In response to the one or more review criteria being met, the operator may receive images or video showing the other vehicle approaching the stopped autonomous vehicle. In another example, the autonomous vehicle may be stopped on a side of a road awaiting a further instruction. The one or more review criteria may relate to a siren from an emergency vehicle and/or a person approaching the autonomous vehicle. In response to the one or more review criteria being met, the computing system may provide to the operator images, audio, and/or video corresponding to the event that triggered the one or more review criteria being met.

To facilitate operation in the rewind mode, the computing system may receive the pre-stored data at some point during operation in the first mode or the second mode. The act of the computing system receiving the pre-stored data may involve receiving the pre-stored data from the vehicle (e.g., vehicle 200) and/or from a server (e.g., server computing system 306). In implementations where the computing system is the server, the act of the computing system receiving the pre-stored data may involve receiving the pre-stored data from the vehicle or from another server.

In some examples, the pre-stored data may include data that was stored as long as hours, days, or weeks in the past (e.g., with respect to the time when the pre-stored data is received by the computing system, or displayed). Additionally or alternatively, the pre-stored data may include data that was stored seconds or milliseconds in the past. For example, the pre-stored data may include an image of an object that is acquired by the vehicle and is then received and/or displayed milliseconds later by the computing system in substantially real-time. In this scenario, the vehicle may be requesting remote assistance in substantially real-time, which the computing system may use as a means for alerting the human operator. The human operator may subsequently choose to observe more data captured previously (i.e. rewind the image data). Other examples and scenarios are possible as well.

The pre-stored data may take various forms. For example, the pre-stored data may take the form of at least a portion of environment data that was previously acquired by the vehicle and was thereafter stored in memory at the vehicle and/or at the server. As such, the pre-stored data may include a video, an audio signal, and/or other data representations of an object in the vehicle's environment, such as any of those described above, including any of those that the computing system may receive while operating in the first mode. For example, the pre-stored data may include an image of a stop sign, a video of various other vehicles in the road, and/or an audio recording of an ambulance siren, among other possibilities.

At block 608, the computing system operates by receiving an operator input by way of a user-interface, such as a GUI. The operator may input a response by way of the user interface based on the at least one image that was provided. The user-interface may include various selectable and non-selectable elements for presenting aspects of the at least one image, such as windows, sub-windows, text boxes, and command buttons. For example, the user-interface may include a window for displaying a video feed of an object, and may further include buttons for stopping, starting, fast-forwarding, and rewinding through the video feed. As another example, the user-interface may include command buttons, such as those labeled "Yes" and "No," which the human operator can click, touch, or otherwise select. As yet another example, the user-interface may include a text box a textual identification of an object. For instance, when viewing pre-stored data including an image of a stop sign, the human operator may use a keyboard to enter the text "stop sign" in a text box that is presented along with the image of the stop sign. Other examples are possible as well. The user-interface may also take the form of any user-interface described herein, including FIGS. 4D and 4E.

Additionally or alternatively to displaying the image data, the image data may be provided non-visually, such as by way of a speaker of the computing system (along with the display of an image). For example, the computing system may enable the human operator to play an audio file when the pre-stored data includes the audio file. For instance, the computing system may display a GUI element that, when selected, plays the audio file. As another example, the computing system may present visual and/or audio pre-stored data, and also play an audio file including a verbal reading of a natural-language question related to the pre-stored data. Other examples are possible as well.

In some implementations, the computing system may include a user interface such as a microphone configured to receive voice commands that are representative of the human operator's response to the alertness data, and the computing system may then process the voice commands to determine the response. For instance, the human operator may view the data including (i) a video of the person approaching a stopped autonomous vehicle and (ii) a prompt for the human operator to speak an indication of the event and/or speak a command for the vehicle. Accordingly, by watching previously-recorded image(s), the human operator can provide a correct input.

The computing system may provide other ways for the human operator to interact with the data and provide a response. For example, the GUI may enable the human operator to adjust a visual representation of a bounding box surrounding the object at issue, such as in scenarios where the vehicle may have incorrectly sized the bounding box.

As another example, the GUI may enable the human operator to select an area of interest in the pre-stored data for further analysis. Such an area of interest may include important objects in the environment that the vehicle did not correctly identify or did not attempt to identify, or may include any object for which the human operator believes their feedback may be desired. As a more specific example, the computing system may display, to the human operator, an image of the pre-stored data that the vehicle may have annotated with the alleged identities of various relevant objects. For instance, the image may include a stop sign, crosswalk, and two pedestrians, but, as a result of the vehicle's object detection, the stop sign, crosswalk, and only one pedestrian may have been correctly identified and annotated in the image as such (e.g., "Stop Sign" text near, or otherwise associated with the stop sign portion of the image, and so forth). In this scenario, the GUI may enable the human operator to select the portion of the image containing the other pedestrian and indicate that the object in that portion of the image is the other pedestrian.

At block 610, in response to receiving an operator input, the computing system operates by providing an instruction to the autonomous vehicle for execution by the autonomous vehicle via a network. As previously stated, an operator may provide an input by way of the user interface. The input may be an identification of an object, and instruction for the autonomous vehicle, a description of a situation, and/or other input. In response to receiving the input, the computing system may cause a command to be issued to the autonomous vehicle. The computing system may issue the command over a network so the command is sent to the autonomous vehicle wirelessly.

In some examples, a command may be entered by the operator. In this instance, the computing system may verify that the command is safe, and upon verification, transmit the command to the vehicle. In other instances, the computing system may determine a command based on the operator's input. Once the command is determined, it may be communicated to the autonomous vehicle. The autonomous vehicle may responsively perform the action described by the command once it is received.

In some examples, the command may instruct the autonomous vehicle to move. In other examples, the command may instruct the autonomous vehicle to lock or unlock the doors. In yet other examples, the command may instruct the autonomous vehicle to stay in the same position. Various other commands are possible as well.

As another example, in line with the discussion above, a computing system (e.g., remote computing system 302 or server computing system 306) may operate in a rewind mode as shown by method 620. As shown in FIG. 6B, block 622, the computing system operates by receiving image data from the autonomous vehicle of an environment of the autonomous vehicle. As previously discussed, the received image data may be stored in a memory of the remote assistance system. Block 622 may operate in a similar manner to block 602 as described previously.

At block 624, the computing system operates by determining that at least one object of the environment of the autonomous vehicle has a detection confidence below a threshold based on data received from the autonomous vehicle. In some examples, the vehicle may provide an indication to the computing system that an object has a low detection confidence. In this example, the vehicle may request assistance for object identification. In other examples, the computing system may determine that an object has a low detection confidence through analysis of data provided by the vehicle.

The object may have a low detection confidence based on a variety of reasons. In some examples, the system may have a hard time identifying the object, such as a partially obscured sign. In other examples, a movement of the vehicle may cause the vehicle to lose confidence in the object identification. For example, the vehicle may correctly identify a road sign, but as the vehicle approaches the sign, the angle between the vehicle and the sign may cause the vehicle to lose confidence in the identification. In other examples, the object may no longer be within view of the various cameras or imaging devices of the vehicle (e.g., because the vehicle may have gotten too close to the object to image it). In this case, the object may become lost to the field of view of the imaging device. Therefore, the previously detected object may have a low detection confidence when it is no longer in the field of view of the imaging devices. Objects may have a low detection confidence based on many other reasons as well.

At block 626, the computing system operates by providing at least one image to an operator from the memory, wherein at least one image comprises previously-stored image data related to the at least one object of an environment of the autonomous vehicle has a detection confidence below a threshold. Block 626 may function in a similar manner to block 606 as described above. The at least one image provided to operator, as previously discussed, may correspond to a predetermined period of time before the low detection confidence was detected. Therefore, the system may playback a video, at least one image, and/or sound to the operator of the environment of the vehicle before the low detection confidence was detected.

At block 628, the computing system operates by receiving an operator input. Block 628 may function in a similar manner to block 608 as described above. In practice, the operator may provide a correct identification of the object having the low detection confidence.

At block 630, in response to receiving an operator input, the computing system operates by providing an instruction to the autonomous vehicle for execution by the autonomous vehicle by way of a network. Block 630 may function in a similar manner to block 610 as described above to provide an instruction for the autonomous vehicle to execute in response to the operator input.

As another example, in line with the discussion above, a computing system (e.g., remote computing system 302 or server computing system 306) may operate in a rewind mode as shown by method 640. As shown in FIG. 6C, at block 642 the computing system operates by receiving image data from the autonomous vehicle of an environment of the autonomous vehicle. As previously discussed, the received image data may be stored in a memory of the remote assistance system. Block 642 may operate in a similar manner to block 602 as described previously.

At block 644, the computing system operates by receiving an indication of a tactile event from the autonomous vehicle. A tactile event may be sensed by the vehicle itself and reported to the computing system. Reporting of the tactile event may include force information captured by sensors of the autonomous vehicle. Tactile events may include, driving over a speed bump, running over a stick in the street, hitting a pothole, bumping a curb, unexpected acceleration or deceleration of the vehicle, or other tactile event. In response to the tactile event, the vehicle may report that a tactile event happened, report that assistance is needed in response to the event, and/or the computing system may recognize the tactile event based on sensor data from the vehicle. In some examples, a tactile event may be recognized by the vehicle and a tactile event indication may be communicated to the computing system. In other examples, the computing system may receive the sensor data, and detect the tactile event based on the received data. The sensor data may come from sensors such as an IMU, accelerometer, RADAR, LIDAR, impact sensor, etc. In some other examples, a vehicle may be able to determine a tactile even through movement of the vehicle's body, shock absorbers, or by other means. The tactile event may be a trigger to cause the remote assistance to prompt an operator.

At block 646, the computing system operates by providing at least one image to an operator from the memory. The at least one image comprises image data related to the tactile event. Block 646 may function in a similar manner to block 608 as described above. The at least one image provided to operator, as previously discussed, may correspond to a predetermined period of time before the tactile was detected. Therefore, the system may playback a video, at least one image, and/or sound to the operator of the environment of the vehicle before the tactile was detected.

In some further examples, the remote operator may be located at a vehicle simulator. In the vehicle simulator, the remote operator may be able to see a simulated view and feel tactile events as if the operator was in the autonomous car. Block 646 may also include generating a simulation in response to the tactile event. The simulation may include a predetermined period of time before the tactile event. In practice, the simulation may enable the operator to see and feel what the autonomous vehicle occupants saw and felt leading up to the tactile event. The operator may provide an input at block 648 after experiencing the simulated tactile event.

At block 648, the computing system operates by receiving an operator input. Block 648 may function in a similar manner to block 608 as described above. In practice, the operator may provide an identification of the cause of the tactile event and/or provide an instruction for the autonomous vehicle to perform. In some examples, the operator input may also trigger an emergency call based on the tactile event.

At block 650, in response to receiving an operator input, the computing system operates by providing an instruction to the autonomous vehicle for execution by the autonomous vehicle by way of a network. Block 650 may function in a similar manner to block 610 as described above to provide an instruction for the autonomous vehicle to execute in response to the operator input.

Figure 7:
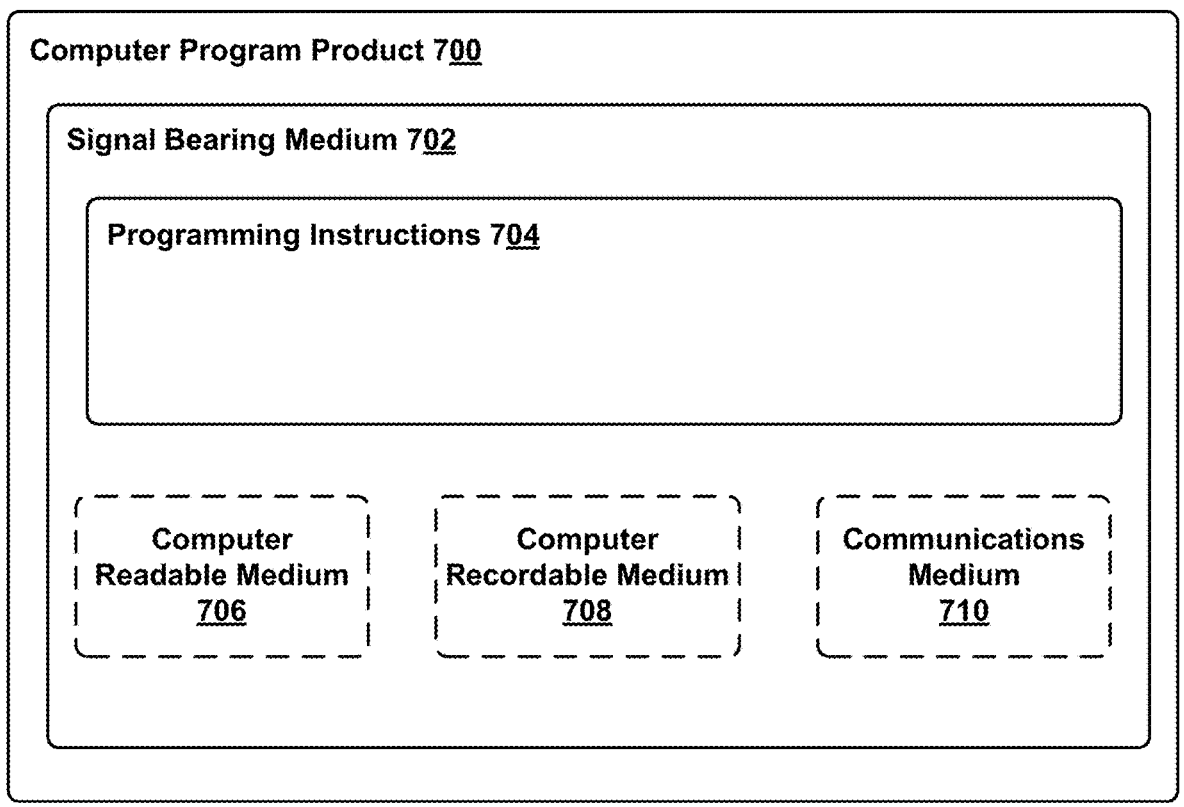
FIG. 7 is a schematic diagram of a computer program, according to an example implementation.

FIG. 7 is a schematic diagram of a computer program, according to an example implementation. In some implementations, the disclosed methods may be implemented as computer program instructions encoded on a non-transitory computer-readable storage media in a machine-readable format, or on other non-transitory media or articles of manufacture.

In an example implementation, computer program product 700 is provided using signal bearing medium 702, which may include one or more programming instructions 704 that, when executed by one or more processors may provide functionality or portions of the functionality described above with respect to FIGS. 1-6. In some examples, the signal bearing medium 702 may encompass a non-transitory computer-readable medium 706, such as, but not limited to, a hard disk drive, a Compact Disc (CD), a digital versatile disk (DVD), a digital tape, memory, components to store remotely (e.g., on the cloud) etc. In some implementations, the signal bearing medium 702 may encompass a computer recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Similarly, the signal bearing medium 702 may correspond to a remote storage (e.g., a cloud). A computing system may share information with the cloud, including sending or receiving information. For example, the computing system may receive additional information from the cloud to augment information obtained from sensors or another entity. Thus, for example, the signal bearing medium 702 may be conveyed by a wireless form of the communications medium 710.

The one or more programming instructions 704 may be, for example, computer executable and/or logic implemented instructions. In some examples, a computing device such as the computer system 112 of FIG. 1 or remote computing system 302 and perhaps server computing system 306 of FIG. 3A may be configured to provide various operations, functions, or actions in response to the programming instructions 704 conveyed to the computer system 112 by one or more of the computer readable medium 706, the computer recordable medium 708, and/or the communications medium 710.

The non-transitory computer readable medium could also be distributed among multiple data storage elements and/or cloud (e.g., remotely), which could be remotely located from each other. The computing device that executes some or all of the stored instructions could be a vehicle, such as vehicle 200 illustrated in FIG. 2. Alternatively, the computing device that executes some or all of the stored instructions could be another computing device, such as a server.

The above detailed description describes various features and operations of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method of providing remote assistance for an autonomous vehicle, the method comprising:
   determining, at a computing system, that the autonomous vehicle has stopped based on sensor data received from the autonomous vehicle, wherein the computing system is positioned remotely from the autonomous vehicle;
   determining, by the computing system using the sensor data, one or more review criteria have been met, wherein the one or more review criteria includes an indication that the autonomous vehicle has stopped for at least a threshold period of time awaiting the pickup of a passenger;
   in response to the one or more review criteria being met, providing at least one image to an operator corresponding to a time prior to determining that one or more review criteria have been met;
   receiving, at the computing system, an operator input; and
   in response to the operator input, providing an instruction to the autonomous vehicle for execution by the autonomous vehicle via a network.

2. The method of claim 1, wherein the threshold period of time repeats for the duration the autonomous vehicle is stopped.

3. The method of claim 1, wherein at least one of the one or more review criteria relates to received audio.

4. The method of claim 1, wherein at least one of the one or more review criteria relates to a change in the environment of the autonomous vehicle.

5. The method of claim 1, wherein the at least one image comprises a video.

6. The method of claim 5, wherein the video is recorded by a camera of the autonomous vehicle.

7. The method of claim 6, wherein the video comprises a predetermined length of video stored from the autonomous vehicle.

8. The method of claim 1, wherein the instruction to the autonomous vehicle comprises an instruction for the autonomous vehicle to change location.

9. The method of claim 1, further comprising:
   determining the threshold period of time based on an environment of the autonomous vehicle.

10. The method of claim 9, wherein determining the threshold period of time based on the environment of the autonomous vehicle comprises:
    determining the threshold period of time based on the autonomous vehicle being stopped proximate a driveway or in a double-parked arrangement with at least one parked vehicle.

11. A system comprising:
    a wireless communication system configured to communicate with an autonomous vehicle via a network, wherein the wireless communication system is configured to:
       receive sensor data from the autonomous vehicle, the data comprising image data and location data,
       send instructions to the autonomous vehicle for execution by the autonomous vehicle; and
    a processor positioned remotely from the autonomous vehicle, wherein the processor is configured to:
       determine the autonomous vehicle has stopped based on the sensor data received from the autonomous vehicle,
       determine, using the sensor data, one or more review criteria have been met, wherein the one or more review criteria includes an indication that the autonomous vehicle has stopped for at least a threshold period of time awaiting the pickup of a passenger,
       in response to the one or more review criteria being met, provide at least one image to an operator corresponding to a time prior to determining that one or more review criteria have been met,
       receive an operator input, and
       determine at least one instruction for the autonomous vehicle, and cause the wireless communication system to send the instruction to the autonomous vehicle.

12. The system of claim 11, further comprising a memory configured to store the image data.

13. The system of claim 11, wherein the image data comprises video data.

14. The system of claim 11, wherein the threshold period of time repeats for the duration the autonomous vehicle is stopped.

15. The system of claim 11, wherein at least one of the one or more review criteria relates to an audio signal.

16. The system of claim 11, wherein at least one of the one or more review criteria relates to a change in the environment of the autonomous vehicle.

17. An article of manufacture including a non-transitory computer-readable medium having stored thereon instructions that, when executed by a processor cause the processor to perform operations comprising:
   determining an autonomous vehicle has stopped based on sensor data received from the autonomous vehicle, wherein the processor is positioned remotely from the autonomous vehicle;
   determining, using the sensor data, one or more review criteria have been met, wherein the one or more review criteria includes an indication that the autonomous vehicle has stopped for at least a threshold period of time awaiting the pickup of a passenger;
   in response to the one or more review criteria being met, providing at least one image to an operator corresponding to a time prior to determining that one or more review criteria have been met;
   receiving an operator input; and
   in response to the operator input, providing an instruction to the autonomous vehicle for execution by the autonomous vehicle via a network.

18. The article of manufacture of claim 17, wherein at least one of the one or more review criteria relates to an audio signal or a change in the environment of the autonomous vehicle.

19. The article of manufacture of claim 18, wherein the threshold period of time repeats for the duration the autonomous vehicle is stopped.

20. The article of manufacture of claim 17, wherein the at least one image comprises a video.

\* \* \* \* \*